(12) United States Patent
Contrael et al.

(10) Patent No.: US 12,027,841 B2
(45) Date of Patent: Jul. 2, 2024

(54) CIRCUIT BREAKER DISTRIBUTION SYSTEM CONFIGURED TO PROVIDE SELECTIVE COORDINATION

(71) Applicant: Siemens Industry, Inc., Alpharetta, GA (US)

(72) Inventors: Barry R. Contrael, Cumming, GA (US); Jorg Sizemore, Duluth, GA (US); James Edward Ferree, Lawrenceville, GA (US); Hugh T. Kinsel, Sugar Hill, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 114 days.

(21) Appl. No.: 17/402,267

(22) Filed: Aug. 13, 2021

(65) Prior Publication Data

US 2022/0399713 A1  Dec. 15, 2022

Related U.S. Application Data

(60) Provisional application No. 63/208,830, filed on Jun. 9, 2021.

(51) Int. Cl.
*H02H 3/08* (2006.01)
*H02H 1/00* (2006.01)
*H02H 3/02* (2006.01)
*H02H 9/02* (2006.01)

(52) U.S. Cl.
CPC .......... *H02H 3/021* (2013.01); *H02H 1/0007* (2013.01); *H02H 3/08* (2013.01)

(58) Field of Classification Search
CPC ......... H02H 3/021; H02H 3/08; H02H 1/0007

USPC ........................................................ 361/93.1
See application file for complete search history.

(56) References Cited

U.S. PATENT DOCUMENTS

2019/0103742 A1*  4/2019  Kennedy ............... H01H 89/00
2019/0341213 A1*  11/2019  Kouroussis ............ H02H 3/167

* cited by examiner

*Primary Examiner* — Jared Fureman
*Assistant Examiner* — Lucy M Thomas

(57) ABSTRACT

A circuit breaker distribution system is configured to provide selective coordination. The system comprises a solid-state switch disposed as a main or upstream breaker and a switch with an over current protection disposed as a branch or downstream breaker. The solid-state switch comprises a microcontroller to: allow repeated pulses of current through to the branch or downstream breaker in an event of an overload or short circuit, choose a maximum current limit for the solid-state switch as a "chop level" such that the chop level is chosen higher than a rated current of the solid-state circuit breaker but low enough that the solid-state switch is not damaged from repeated pulses over a period of time needed to switch OFF the branch or downstream breaker, and add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform.

22 Claims, 25 Drawing Sheets

FIG. 23

| Prospective Bolted Fault Short Circuit Current [A] | No Interval Between Pulses ||| System Voltage Waveform Optimized |||
|---|---|---|---|---|---|---|
| | Chop Count | Unlatch Time [seconds] | Chop Density [chop/seconds] | Chop Count | Unlatch Time [seconds] | Chop Density [chop/seconds] |
| 400 | 3 | 0.022 | 136 | 3 | 0.0268 | 112 |
| 500 | 2 | 0.0134 | 149 | 6 | 0.0475 | 126 |
| 1000 | 16 | 0.026 | 615 | 14 | 0.040625 | 345 |
| 2000 | 61 | 0.4425 | 1379 | 18 | 0.0315 | 571 |
| 5000 | 273 | 0.0755 | 3616 | 262 | 0.145875 | 1796 |
| 10000 | 645 | 0.0875 | 7371 | 613 | 0.1649 | 3717 |
| 14000 | 2220 | 0.23375 | 9497 | 908 | 0.192 | 4729 |

CIRCUIT BREAKER DISTRIBUTION SYSTEM CONFIGURED TO PROVIDE SELECTIVE COORDINATION

BACKGROUND

1. Field

Aspects of the present invention generally relate to a circuit breaker distribution system configured to provide selective coordination.

2. Description of the Related Art

The problem is how to achieve selective coordination in an electrical distribution system when the main or upstream circuit breaker is a solid-state circuit breaker (SSCB) and the branch or downstream breaker is a conventional thermal/magnetic circuit breaker.

The field of invention is electrical distribution systems for switching low voltage (<=1000V) power circuits in residential, industrial and commercial buildings. These systems utilize circuit breakers which are arranged in a hierarchical manner. Typically, a larger main circuit breaker feeds power to multiple smaller branch breakers. These branch breakers feed power to either end loads or to further smaller branch breakers. The main breaker is said to be "upstream" of the branch breakers, and the branch breakers are said to be "downstream" of the devices that feed power to them. Likewise, a branch breaker is upstream of any smaller breakers to which it feeds power. The upstream breakers typically are designed with short circuit interruption ratings that match or exceed the downstream breakers. In this way, the upstream breakers provide backup protection. If a branch breaker is unable to interrupt a short circuit fault, then an upstream breaker will open and interrupt the fault so that the electrical circuits are protected from damage and igniting any fires.

The concept of selective coordination means that when a fault occurs only the circuit breaker which is immediately upstream of the fault will trip. This limits the interruption of power to only that part of the circuit which is experiencing a problem. This avoids a wide-spread power outage to other parts of the system. For example, if a fault occurs at an end load only the branch breaker of that circuit should trip and not the main breaker. Selective coordination is highly desirable and is often, but not always, a specified requirement for new installations.

Circuit breakers in general are devices that can stop the flow of an electrical current under various conditions. Circuit breakers must be able to stop normal rated current when switched off. Also, they must interrupt overload currents, from 135% to 10 times rated current, and short circuits up to the marked interrupting capacity of the device.

Conventional low voltage circuit breakers utilize mechanically separating contacts to interrupt the flow of current. As the contacts open, an electric arc temporarily conducts through air between the contacts as the current is being switched off, under all conditions of switching off under load. The arc is inherent because whenever current is flowing, there will be inductive energy stored in the overall circuit that must be dissipated when the flow of current stops. The arc is resistive and produces a reverse voltage that stops the flow of current. A spring mechanism is used to open the contacts. Some circuit breakers have a blow-apart construction, in which high short circuit currents give rise to magnetic forces that assist in rapid contact separation, faster than can be achieved by a spring mechanism alone.

A sub-group of low voltage circuit breakers are conventional miniature circuit breakers (MCBs) used for small end loads such as 15-20 A circuits or lighting loads which have been used for many years. These are commercially mature and low-cost devices. They typically contain overload and short-circuit trip actuators in the form of bimetals and electromagnets, respectively. As such they are termed "thermal/magnetic" breakers. These are commonly used as branch breakers.

Even the smallest MCBs will have a short-circuit interrupting capacity of 5 or 10 kA. This amount of current typically far exceeds the normal rated current of the circuit breakers that are immediately upstream, which for example might be rated 100 or 200 A. This means a breaker that is upstream of a MCB must be able to respond and interrupt a 5 or 10 kA fault current. But if selective coordination is a requirement, then the upstream breaker must wait without responding and allow the MCB to interrupt the circuit if possible. But if the fault is between the MCB and the upstream breaker, or if the MCB is unable to interrupt for any reason, then the upstream breaker must interrupt the fault.

Solid-state circuit breakers (SSCBs) that meet industry standards for low voltage circuit breakers such as UL 489 are an emerging technology. A SSCB stops the flow of current using solid state electronics, for example, with metal-oxide-semiconductor field-effect transistor (MOSFET) components. Like conventional arc-extinguishing circuit breakers, a SSCB produces a reverse voltage that stops the flow of current. This reverse voltage is produced via a so-called pinching effect at the solid-state junction. (This effect is well-known in the field of power electronics.) As with conventional breakers, there is inductive energy in the circuit that must be dissipated when the flow of current is stopped. Unlike conventional breakers, the energy is not dissipated via arcing; rather, it is dissipated in the electronic junction and is a function of the junction voltage, current level, and time to reduce the current to zero. The time required to stop the current in a SSCB is extremely shorter than an arc-extinguishing breaker. An arc-extinguishing breaker requires from 2 to 16 milliseconds or greater time to extinguish, whereas a SSCB is orders of magnitude faster with time measured in nanoseconds or microseconds. This has two beneficial effects: (1) the short-circuit can be stopped before the current rises to abnormally high levels, and (2) the time duration as current falls to zero is extremely short. The first benefit is that the inductive energy from the short circuit is much smaller than with an arc-extinguishing circuit breaker, because the current never rises to a high level. The second benefit is that there is little additional heat energy produced in addition to the inherent inductive energy while the current is falling to zero. As a result, a SSCB can interrupt a short circuit without any arcing at all.

On the one hand, a SSCB has excellent potential as a main or upstream breaker. It can provide superior protection to all branch circuits. It can potentially eliminate damaging let-through currents. It can stop the flow of current quickly enough to reduce or eliminate arcing damage in downstream breakers. It can stop the flow of current at any point in the waveform before it rises to a damaging level, and below the level of current that will magnetically blow apart downstream circuit breaker contacts. It can provide back-up protection for very high available fault currents.

On the other hand, SSCBs have an inherent weakness that presents a great difficulty for achieving selective coordination. A SSCB cannot carry currents above its normal rated current for any sustained length of time. A SSCB must prevent currents from rising to high levels for self-protection. A MOSFET is unable to carry short-circuit level current without being destroyed. The electronic junction is small, and it heats very quickly. For silicon (Si) and silicon carbide (SiC) technologies, the maximum junction temperatures are limited to about 150° C. and 600° C. respectively. Corresponding operating temperature limits in equipment containing Si and SiC components are about 125° C. and 200° C., respectively. Because of this, a SSCB must switch off when, for example, the current rises to about 5 times its normal current rating. (These values are not exact and are given only as approximate examples. There are multiple semiconductor technologies, and improvements are rapidly being made.) By contrast, the maximum short circuit current withstand capability of conventional circuit breaker contacts is determined primarily by the melting points of the metals—usually silver, tungsten, and copper—which are much higher than semiconductor temperature limits. Furthermore, the contact structures are massive in comparison with a semiconductor junction. Much more heat is required to increase the temperature of conventional breaker contacts.

But the magnetic release in a thermal/magnetic breaker requires sustained current to move the magnetic actuator. If a thermal/magnetic breaker is downstream of a SSCB and if the SSCB switches off the current in only a few microseconds, then the thermal/magnetic breaker will remain latched. This is opposite and in contradiction to the concept of selective coordination.

An obvious solution might be to use SSCBs as both the main and branch breakers. However, SSCBs are many times more costly than conventional thermal/magnetic breakers. Such a solution would be cost-prohibitive in most cases.

Therefore, there exists a need for a means for a downstream conventional thermal/magnetic breaker to actuate its magnetic trip device on an overload or short circuit fault when it is being protected by an upstream SSCB.

SUMMARY

Briefly described, aspects of the present invention relate to a circuit breaker distribution system configured to provide selective coordination. The invention is described in terms of a solid-state circuit breaker (SSCB) with a continuous current rating of 100 A as main breaker, and a conventional miniature circuit breaker (MCB) with 20 A continuous current rating as the branch on a single-phase circuit. The circuit has system voltage of 240 VAC 60 Hz. The SSCB is programmed with logic so that in the event of an overload or short circuit the SSCB allows repeated pulses of current through to the branch breakers. A maximum current limit for the SSCB is chosen and defined as a "chop level". The chop level is chosen higher than the rated current of the SSCB, but low enough that the SSCB is not damaged from repeated pulses over the period of time needed to trip a downstream breaker. The chop level is high enough that the magnetic actuator in the downstream breaker has sufficient force to actuate tripping in the downstream device, but low enough that repeated momentary peaks of current do not damage the semiconductor junctions of the SSCB. The logic of the SSCB shall be programmed so that in the event of an overcurrent condition which causes the SSCB to stop the current at the chop level (500 A), repeated pulses of overload or short circuit current are subsequently delivered to the downstream circuit. The repeated pulses shall be continued for a specified delay period, a preset length of time. Let us name this the "selectivity delay." This gives the downstream MCB time to trip. After the selectivity delay is exceeded, the SSCB will shut off the current and open, and repeated pulsing will cease. The selectivity delay can optionally be adjustable in a SSCB user interface. If the MCB trips during the selectivity delay, the SSCB is programmed to recognize that the current is no longer rising to the chop level. It shall then cease to chop the current. The SSCB returns to a continuous ON state and allows current to flow to other branches downstream. Thus, selectivity is achieved, because only the MCB branch breaker has tripped and cut off current to the branch circuit containing the fault. Each pulse of current that is let through the SSCB has a variable length of time. This is because different lengths of time are required for the current to rise to the chop level. The SSCB chop criterion must be the chop level, and not a specific length of time. The SSCB chopping algorithm must be programmed in a way to allow the current to rise to the chop level (approximately) and then cut the current to zero. The reason for this is because the shape of the waveform is dependent on the phase angle of the voltage waveform at the precise moment each pulse begins. A pulse that begins at 0° phase angle has a different rate of rise and shape than a pulse that begins at 90°, for example. Each pulse begins at a different voltage phase angle, so each pulse will require a different length of time to rise to the chop level.

In accordance with one illustrative embodiment of the present invention, a circuit breaker distribution system is configured to provide selective coordination. The system comprises a solid-state circuit breaker disposed as a main or upstream breaker and a magnetic circuit breaker disposed as a branch or downstream breaker. The solid-state circuit breaker comprises a microcontroller including a processor and a memory, semiconductor junctions, and computer-readable logic code stored in the memory which, when executed by the processor, causes the microcontroller to: allow repeated pulses of current through to the branch or downstream breaker in an event of an overload or short circuit, choose a maximum current limit for the solid-state circuit breaker as a "chop level" such that the chop level is chosen higher than a rated current of the solid-state circuit breaker but low enough that the solid-state circuit breaker is not damaged from repeated pulses over a period of time needed to trip the branch or downstream breaker and add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform.

In accordance with one illustrative embodiment of the present invention, a method of providing selective coordination in a circuit breaker distribution system is provided. The method comprises providing a solid-state circuit breaker disposed as a main or upstream breaker and providing a magnetic circuit breaker disposed as a branch or downstream breaker. The solid-state circuit breaker comprises a microcontroller including a processor and a memory, semiconductor junctions, and computer-readable logic code stored in the memory which, when executed by the processor, causes the microcontroller to: allow repeated pulses of current through to the branch or downstream breaker in an event of an overload or short circuit, choose a maximum current limit for the solid-state circuit breaker as a "chop level" such that the chop level is chosen higher than a rated current of the solid-state circuit breaker but low enough that the solid-state circuit breaker is not damaged from repeated pulses over a period of time needed to trip the branch or downstream breaker and add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform.

In accordance with one illustrative embodiment of the present invention, a circuit breaker distribution system is configured to provide selective coordination. The system comprises a solid-state switch disposed as a main or upstream breaker and a switch with an over current protection disposed as a branch or downstream breaker. The solid-state switch comprises a microcontroller including a processor and a memory and computer-readable logic code stored in the memory which, when executed by the processor, causes the microcontroller to: allow repeated pulses of current through to the branch or downstream breaker in an event of an overload or short circuit, choose a maximum current limit for the solid-state switch as a "chop level" such that the chop level is chosen higher than a rated current of the solid-state circuit breaker but low enough that the solid-state switch is not damaged from repeated pulses over a period of time needed to switch OFF the branch or downstream breaker and add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform.

In accordance with one illustrative embodiment of the present invention, a circuit breaker distribution system is configured to provide selective coordination. The system comprises a solid-state switch disposed as a main or upstream breaker and a switch with an over current protection disposed as a branch or downstream breaker. The solid-state switch comprises transistors that are controllable to turn ON and OFF. The system further comprises a current sensing circuit or a current sensing device configured to turn OFF and ON the solid-state switch which allows repeated pulses of current through to the branch or downstream breaker in an event of an overload or short circuit, chooses a maximum current limit for the solid-state switch as a switch OFF or a "chop" level such that the "chop" level is chosen higher than a rated current of the solid-state switch but low enough that the solid-state switch is not damaged from repeated pulses over a period of time needed to switch OFF the branch or downstream breaker and adds a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform.

BRIEF DESCRIPTION OF THE DRAWINGS

FIGS. 10A, 10B, 11A, 11B, 12A, 12B, 13A, 13B, 14A, 14B through FIG. 15A, 15B show simulation results for circuits with progressively increasing prospective currents in accordance with an exemplary embodiment of the present invention.

FIGS. 19A, 19B, 20A, 20B, 21A, 21B through 22A, 22B, the chopped current has been modified to be "system voltage waveform optimized" as shown FIG. 18 in accordance with an exemplary embodiment of the present invention.

FIG. 23 shows a table with advantages of maintaining current at zero in the vicinity of the peaks of the voltage waveforms in accordance with an exemplary embodiment of the present invention.

DETAILED DESCRIPTION

Figure 1:
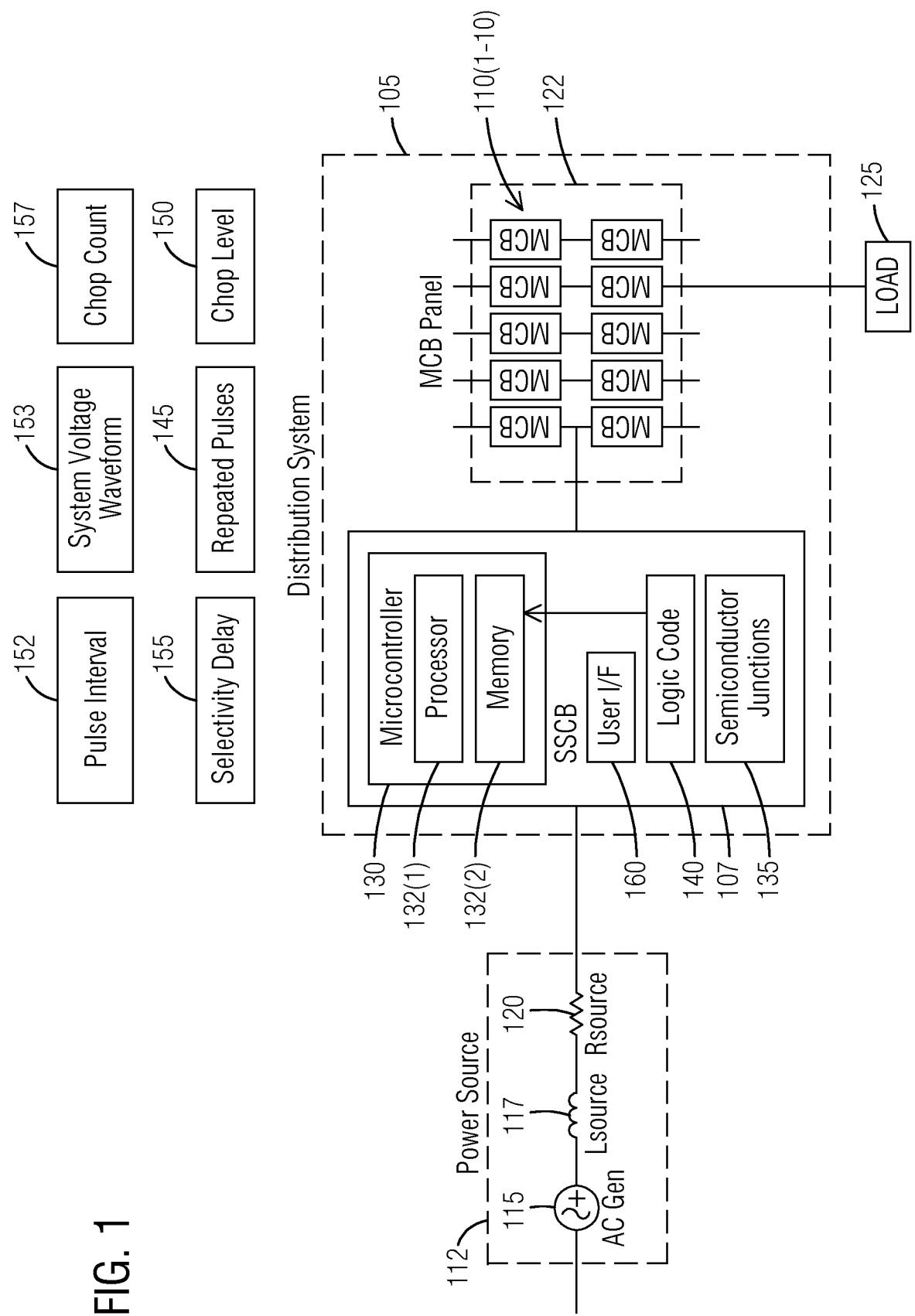
FIG. 1 shows a schematic overview of one phase of a distribution system that includes a SSCB and multiple branch breakers in accordance with an exemplary embodiment of the present invention.

To facilitate an understanding of embodiments, principles, and features of the present invention, they are explained hereinafter with reference to implementation in illustrative embodiments. In particular, they are described in the context of a circuit breaker distribution system configured to provide selective coordination. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the circuit breaker distribution system according to the present disclosure are described below with reference to FIGS. 1-19 herein. Like reference numerals used in the drawings identify similar or identical elements throughout the several views. The drawings are not necessarily drawn to scale.

Consistent with one embodiment of the present invention, FIG. 1 represents a block diagram of one phase of a circuit breaker distribution system 105 that includes a solid-state circuit breaker (SSCB) 107 and multiple branch breakers 110(1-10) in accordance with an exemplary embodiment of the present invention. The distribution system 105 is connected to a power source 112. The power source 112 comprises all components of an incoming power system: the generating station, any substations, transmission lines and transformers. For calculation purposes, this can be reduced to an AC voltage generator 115, a source inductance 117 and a source resistance 120 as shown.

A simple example distribution system is shown. This is comprised of the SSCB 107 as a main breaker, which feeds a power panel 122 containing multiple branch breakers 110(1-10) being multiple MCBs as branch breakers. The SSCB 107 and MCBs 110(1-10) might be combined into a single enclosure. However, it is likely that the SSCB 107 will be in a separate enclosure, and the MCBs 110(1-10) will be mounted into a conventional panel enclosure of a type that is readily available and low-cost. Each MCB feeds a separate branch circuit. A branch circuit with a load 125 for one of the MCBs is shown.

The circuit breaker distribution system 105 is configured to provide selective coordination. The system 105 comprises the solid-state circuit breaker 107 disposed as a main or upstream breaker. The system 105 comprises a magnetic circuit breaker such as MCB 110(1) disposed as a branch or downstream breaker.

The solid-state circuit breaker 107 comprises a microcontroller 130 including a processor 132(1) and a memory 132(2). The solid-state circuit breaker 107 further comprises semiconductor junctions 135. The solid-state circuit breaker 107 further comprises computer-readable logic code 140 stored in the memory 132(2) which, when executed by the processor 132(1), causes the microcontroller 130 to allow repeated pulses 145 of current through to the branch or downstream breaker in an event of an overload or short circuit, choose a maximum current limit for the solid-state circuit breaker 107 as a "chop level" 150 such that the chop level 150 is chosen higher than a rated current of the solid-state circuit breaker 107 but low enough that the solid-state circuit breaker 107 is not damaged from the repeated pulses 145 over a period of time needed to trip the branch or downstream breaker, and add a pulse interval 152 which is optimized to a system voltage waveform 153 in that chopped pulses tend to be longer and more effective for de-latching the branch or downstream breaker when they occur in vicinity of a zero crossing of the system voltage waveform 153 and chopped pulses are shorter and less effective near peaks of the system voltage waveform 153.

The solid-state circuit breaker 107 is arranged in a hierarchical manner such that the main or upstream breaker feeds power to the branch or downstream breaker. The branch or downstream breaker feeds power to either end loads or to further smaller branch breakers.

In operation, when a fault occurs, only a circuit breaker which is immediately upstream of the fault will trip thus limiting an interruption of power to only that part of a circuit which is experiencing a problem, for example, if a fault occurs at an end load, only the branch or downstream breaker of that circuit should trip, and not the main or upstream breaker. In an event of an overcurrent condition which causes the solid-state circuit breaker 107 to stop the current at the chop level 150, the repeated pulses 145 of overload or short circuit current are subsequently delivered to a downstream circuit. The chop level 150 is chosen high enough that a magnetic actuator in the branch or downstream breaker has sufficient force to actuate tripping in a downstream device, but low enough that repeated momentary peaks of current do not damage the semiconductor junctions 135 of the solid-state circuit breaker 107.

The solid-state circuit breaker 107 passes chopped current when the system voltage waveform 153 has a phase angle plus or minus 60° of system voltage zero but for rest of the system voltage waveform 153 when the phase angle is within plus or minus 30° of peak voltage then the solid-state circuit breaker 107 remains in an OFF state and passes no current.

The repeated pulses 145 are to be continued for a specified delay period being a preset length of time called a selectivity delay 155 which gives the branch or downstream breaker time to trip. The pulse interval 152 allows the selectivity delay 155 to be increased without increasing a number of times the current is chopped to zero called "chop count" 157 as every current chop dissipates a certain amount of joule energy in the semiconductor junction 135. Adding the pulse interval 152 reduces a number of ineffective pulses which reduces the chop count 157 as short pulses have a minimal effect for moving a magnetic armature of the branch or downstream breaker but the short pulses greatly increase the chop count 157.

The pulse interval 152 minimizes the chop count 157 required to de-latch the branch or downstream breaker and lengthens the selectivity delay 155, spreading out the chop count 157 over a longer time to reduce a peak temperature of the semiconductor junction 135.

The solid-state circuit breaker 107 further comprises a user interface 160 in which the selectivity delay 155 can optionally be adjustable. After the selectivity delay 155 is exceeded, the solid-state circuit breaker 107 will shut OFF the current and open such that the repeated pulses 145 will cease. A length of the pulse interval 152 is tuned to a fixed value in a firmware or the length of the pulse interval 152 is adjusted by an algorithm in the firmware or the length of the pulse interval 152 is tunable in the user interface 160. Tuning the pulse interval 152 means adjusting 60° and 30° phase angles to different values.

If the branch or downstream breaker trips during the selectivity delay 155, the solid-state circuit breaker 107 is programmed to recognize that the current is no longer rising to the chop level 150 so then ceases to chop the current.

The solid-state circuit breaker 107 returns to a continuous ON state and allows current to flow to other branches downstream thus selectivity is achieved because only the branch or downstream breaker has tripped and cut off current to a branch circuit containing the fault. Each pulse of current that is let through the solid-state circuit breaker 107 has a variable length of time because different lengths of time are required for the current to rise to the chop level 150 such that a solid-state circuit breaker chop criterion is the chop level 150 and not a specific length of time, wherein a solid-state circuit breaker chopping algorithm is programmed in a way to allow the current to rise to the chop level 150 and then cut the current to zero.

The shape of a waveform is dependent on a phase angle of a voltage waveform at a precise moment each pulse begins such that a pulse that begins at a 0° phase angle has a different rate of rise and shape than a pulse that begins at a 90° phase angle. Each pulse begins at a different voltage phase angle so each pulse requires a different length of time to rise to the chop level 150.

Figure 2:
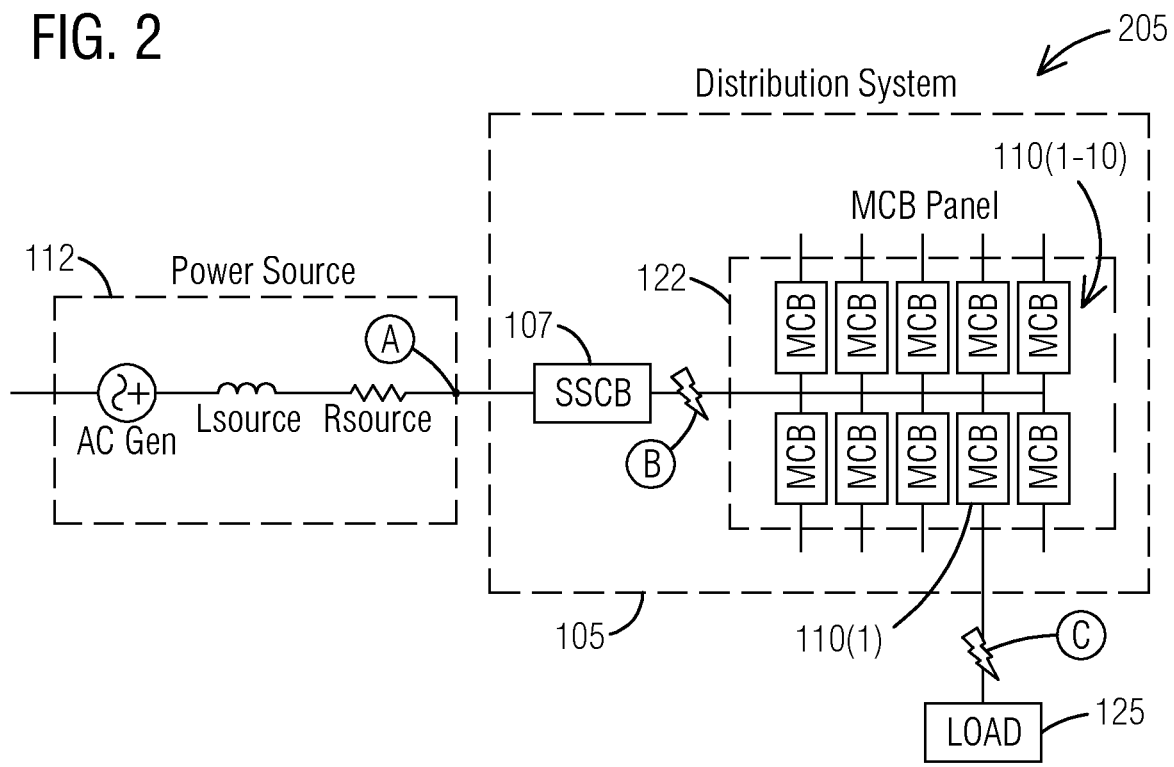
FIG. 2 points out specific points in the circuit where Point A is the point of connection of the SSCB to the power source, Point B is short circuit fault between the SSCB and the branch breakers and Point C is a short circuit fault between a branch breaker and the load. in accordance with an exemplary embodiment of the present invention

Referring to FIG. 2, it points out specific points in a circuit 205. Point A is the point of connection of the SSCB 107 to the power source 112. Point B is short circuit fault between the SSCB 107 and the branch breakers 110(1-10). Point C is a short circuit fault between a branch breaker 110(1) and the load 125.

Figure 3:
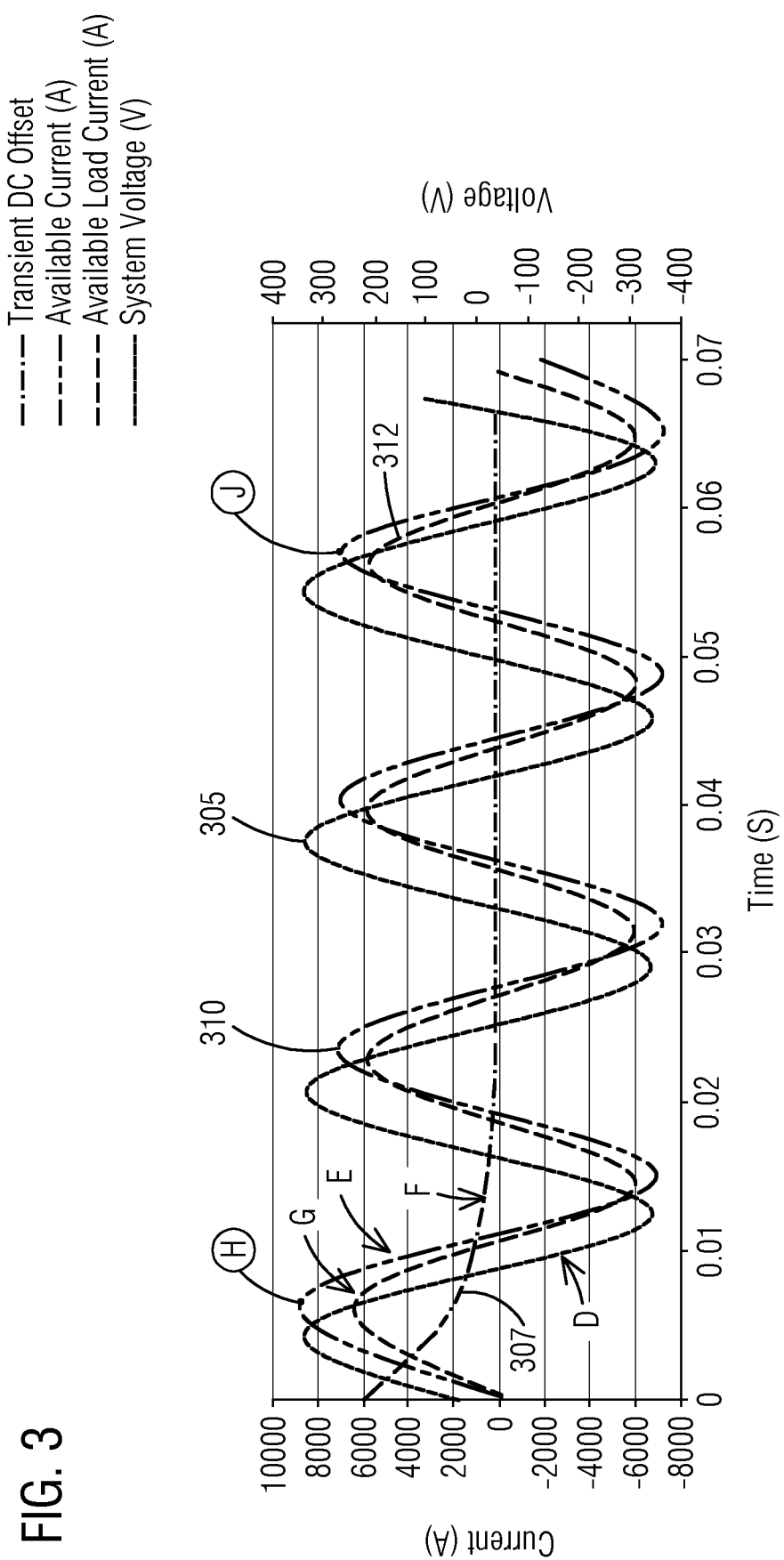
FIG. 3 shows a hypothetical short circuit waveform with 5 kA available current, 0.45 power factor, with 0° initial phase angle (a.k.a. "closing angle") on the voltage waveform in accordance with an exemplary embodiment of the present invention.

Turning now to FIG. 3, it shows a hypothetical short circuit voltage waveform 305 with 5 kA available current, 0.45 power factor, with 0° initial phase angle (a.k.a. "closing angle") on the voltage waveform 305. Also shown are a transient DC offset 307, an available current 310, an available load current 312.

Curve D is the system voltage waveform 305 of an AC circuit. Curve E is the available current 310 at point A of FIG. 2. This is also known in the industry as prospective current, or bolted fault current. It is at this point that the UL 489 standard defines the available current. Point H is the first peak of Curve E. Point J is the 4th peak of curve E. Point H is higher than point J because of a transient DC offset component of the current, also known as the asymmetric offset. Curve F is the transient DC offset 307. Point H is higher than J by an amount that depends on the closing angle of the system voltage 305. Typically, 0° is worst case. At best, H and J have the same height, which case is known as symmetrical current. Curve E obeys the well-known short circuit equation:

$$i(t)=Ip\ \sin(\omega t)+(\theta-\varphi)-\sin(\theta-\varphi)e^{-(R/L)(t)} \quad (1)$$

where i(t) is the current at time t, Ip is peak prospective current, ω is the angular frequency in radians, θ is the initial phase closing angle of the voltage, cos(φ) is the power factor, L and R are circuit inductance and resistance, respectively.

Curve G is the reduced available current for a short circuit fault at point C of FIG. 2. Curve G takes into account the inherent voltage drop across the semiconductor junctions 135 of the SSCB 107, the resistance of the MCB 110(1) which consists mostly of the resistance of a bimetal, and the resistance of 4 feet of cable in the load circuit. (Tests per UL489 include 4 feet of cable to represent a practical minimum.)

It is important to consider the reduction in the available current 310 (per curve G) because it enhances the chopping effect. Chopped pulses are wider and more effective if the available current is smaller. By taking into account the reduction in available current at the load 125, embodiments of the invention can be shown to work for a higher range of available currents.

Figure 4:
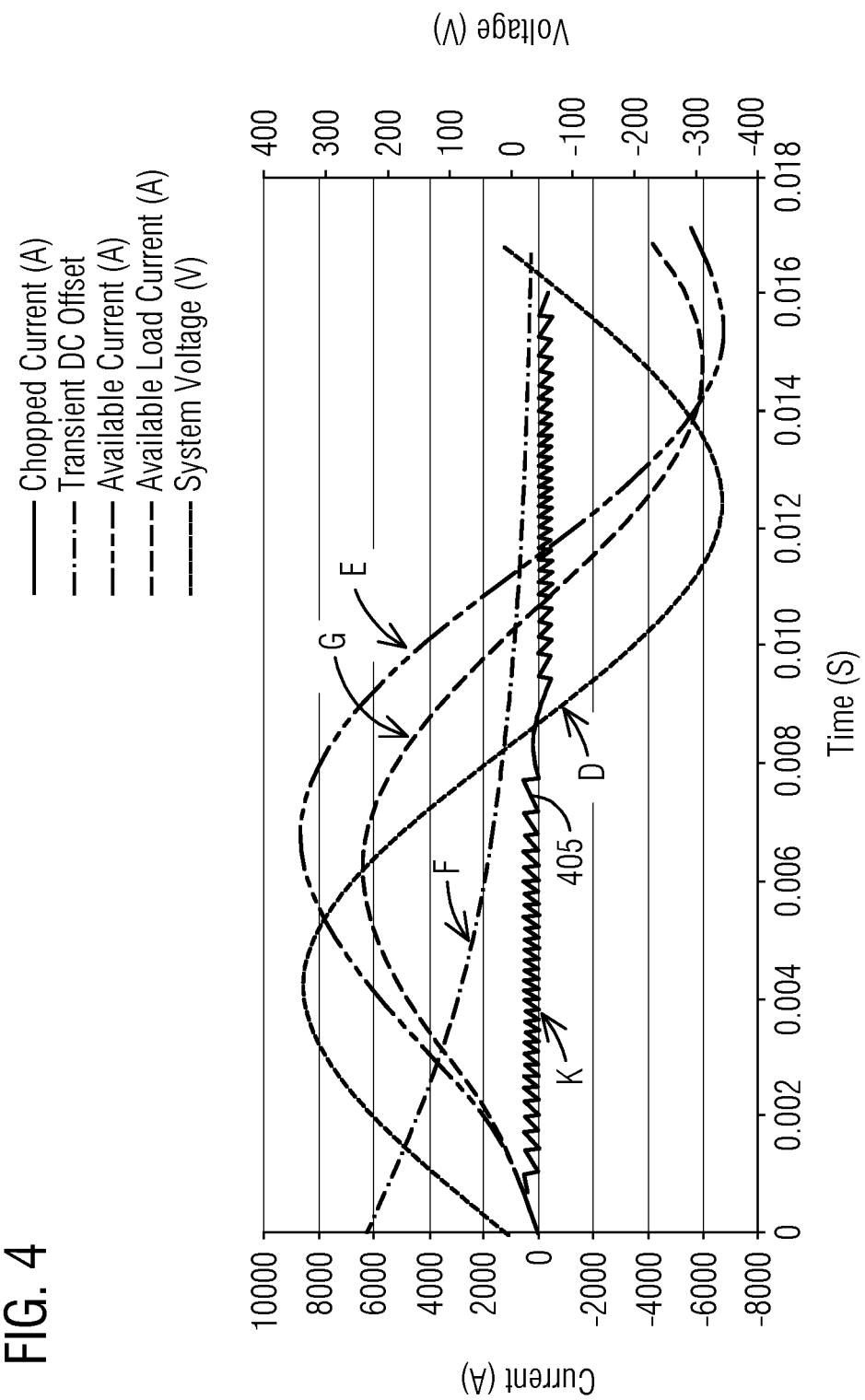
FIG. 4 is the same as FIG. 3, but with a shortened time axis and the addition of curve K.

FIG. 4 is the same as FIG. 3, but with a shortened time axis and the addition of curve K. Curve K is a chopped current curve 405. This represents the current let through during the selectivity delay 155 by a SSCB with the chop level 150 set to 500 A. In this example the pulse interval is set to zero. The purpose of this figure is to illustrate that the chopped current 405 magnitude may be much smaller than the available load current.

Figure 5:
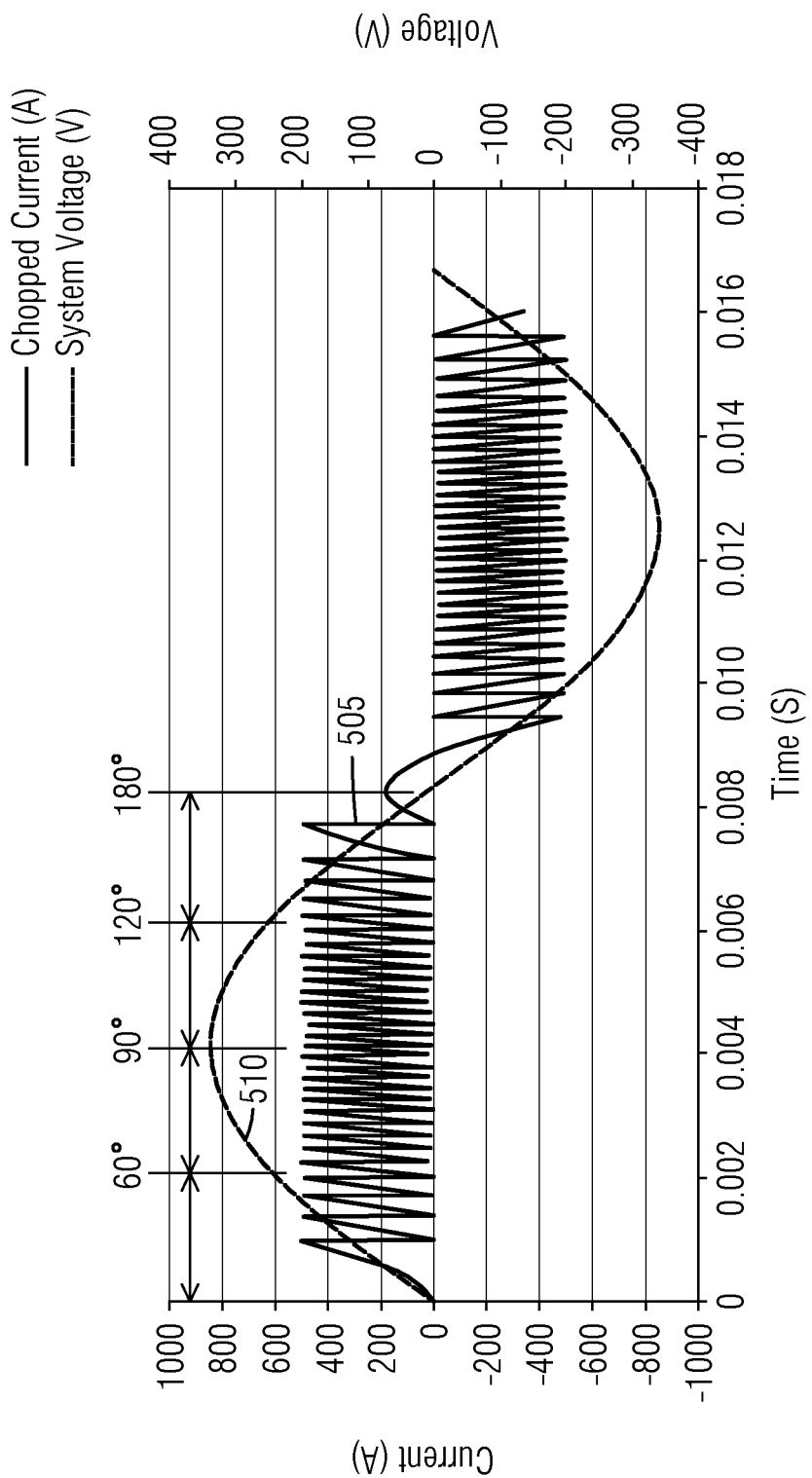
FIG. 5 shows the chopped current and system voltage curves of FIG. 4, but with an expanded vertical axis in accordance with an exemplary embodiment of the present invention.

As seen in FIG. 5, it shows a chopped current curve 505 and a system voltage curve 510 of FIG. 4, but with an expanded vertical axis. Several characteristics of the chopped current are important:

1. Each pulse of current has a different shape. The leading edge of each pulse is a new short-circuit waveform. Every pulse obeys equation (1). But every pulse has a different initial closing angle, and this causes the shapes of the waveforms to vary.
2. The SSCB 107 is programmed to "chop" the current at a chop level of 500 A (in this example).
3. The trailing edge of each pulse falls rapidly to zero, within nanoseconds or a few microseconds.
4. Because of the changing initial closing angle, the pulse durations vary.
5. Pulses have longer duration in the vicinity of the zero crossings of the voltage waveform 510. In the intervals 0° to 60° and 120° to 180°, pulses have longer duration than in the interval from 60° to 120°.
6. Pulses have shorter duration in the vicinity of the peaks of the voltage waveform 510, from 60° to 120°.

Each time the current is chopped, a small amount of energy is dissipated in the semiconductor junctions 135 as heat. It is desirable to avoid chopping the current too many times in too small a time period. The limiting amount of heat varies according to the construction of the SSCB 107 and must be determined for a particular device.

Figure 6:
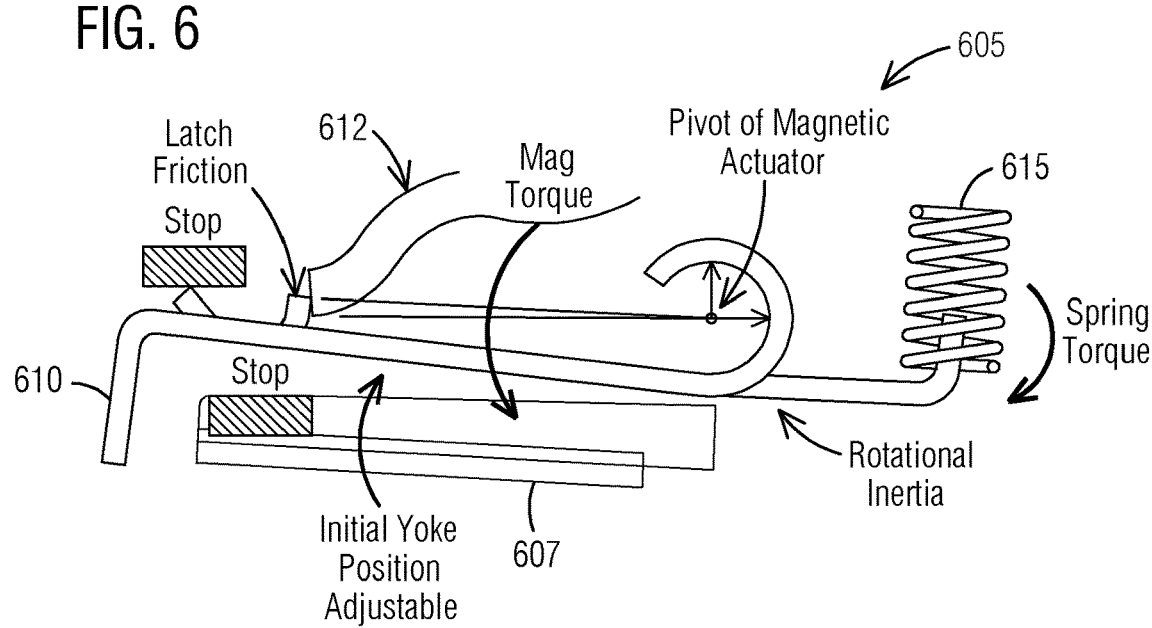
FIG. 6 is a simplified view of a magnetic release in a typical representative MCB in accordance with an exemplary embodiment of the present invention.

As shown in FIG. 6, it is a simplified view of a magnetic release in a typical representative MCB 605. The shapes of parts will vary widely in other MCB designs, however these key behaviors will be similar in many MCBs in the market today.

When current flows through the breaker 605, a magnetic yoke 607 and a magnetic actuator 610, which are comprised of ferromagnetic steel, are attracted toward each other, causing a counterclockwise torque on the actuator 610. A latch lever 612 presses against the magnetic actuator 610 resulting in friction at the latch surface. The latch friction works against rotation of the magnetic actuator 610. Thus, when magnetic force is acting, the latch friction imparts a clockwise torque to the magnetic actuator 610. In addition, a return spring 615 applies clockwise torque to the magnetic actuator 610, so that the breaker 605 can be relatched after tripping. A condition for tripping is $$T_M > (T_F + T_S)$$

where $T_M$ is magnetic torque, $T_F$ is latch friction torque, and $T_S$ is spring torque.

When this condition exists, the armature accelerates rotationally counterclockwise, according to Newton's Law. In angular notation, this is $$\alpha = T/I = [T_M - (T_F + T_S)]/I$$

Where $T = T_M - (T_F + T_S)$ is the net torque on the magnetic actuator 610, I is the rotational inertia of the actuator, and a is rotational acceleration.

The magnetic armature must rotate through the entire delatch angle before the latch lever 612 is released and the breaker trips. This means a certain energy must be overcome by the magnetic torque. This energy is $$E = (T_F + T_S)\theta$$

where θ is the delatch angle. This is significant because if E is not provided in a single pulse, then multiple pulses will be required to trip the MCB 110(1).

Figure 7:
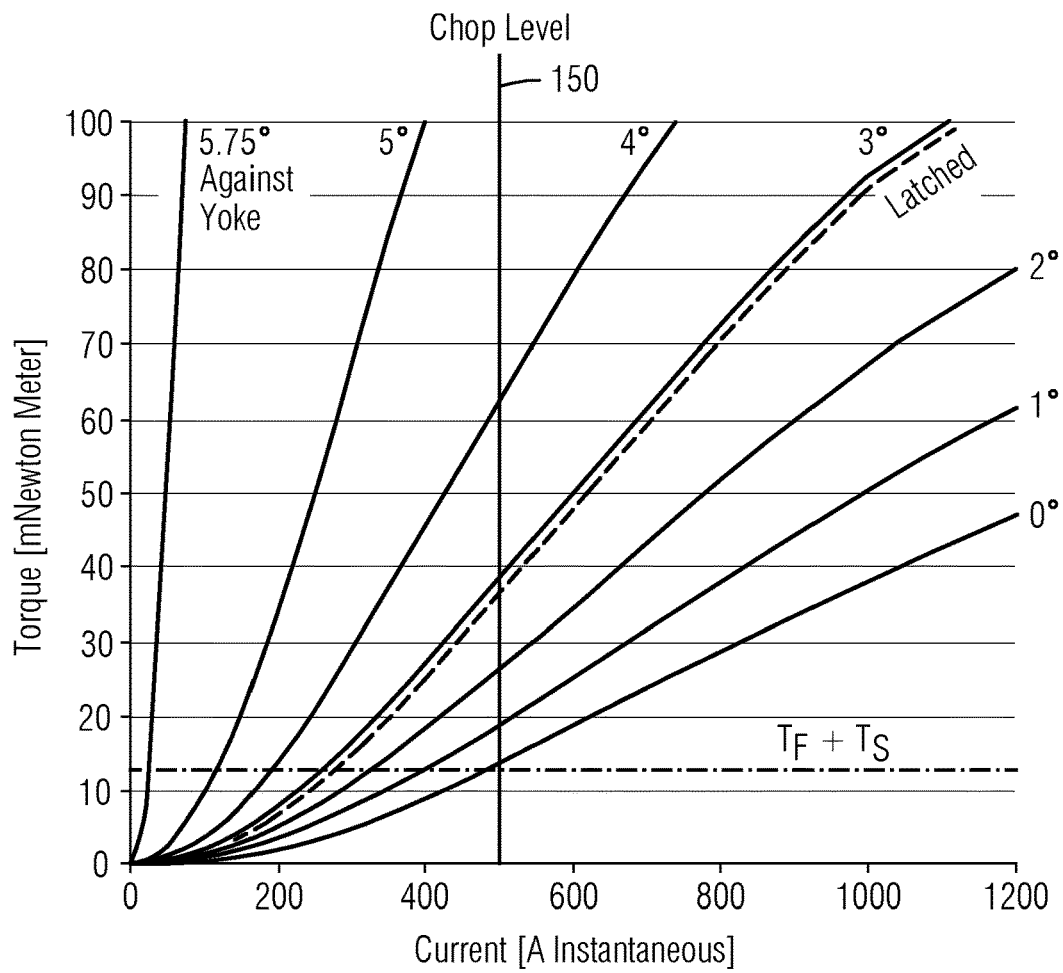
FIG. 7 shows the magnetic torque TM that arises when current flows through the MCB in accordance with an exemplary embodiment of the present invention.

In FIG. 7, it shows the magnetic torque $T_M$ that arises when current flows through the MCB 110(1). Curves of torque versus current are shown for various rotational positions of the magnetic actuator 610. The angle of the latched position is preset in the factory to achieve tripping according to the current level specified in the design.

When the MCB 110(1) is deployed in its usual way, with no SSCB in the circuit, the magnetic actuator 610 moves when magnetic torque is higher than the $T_F+T_S$ line at the latched position. Then, as it moves closer to the yoke 607, the magnetic forces become generally stronger. But the applied current also is constantly changing. Therefore, the magnetic force is a function of both the changing current and the actuator position.

When the MCB 110(1) is applied as a downstream breaker from a SSCB according to the present invention, then the chop level 150 becomes relevant. The applied current will always be less than the chop level 150, which is 500 A in the example.

Figure 8:
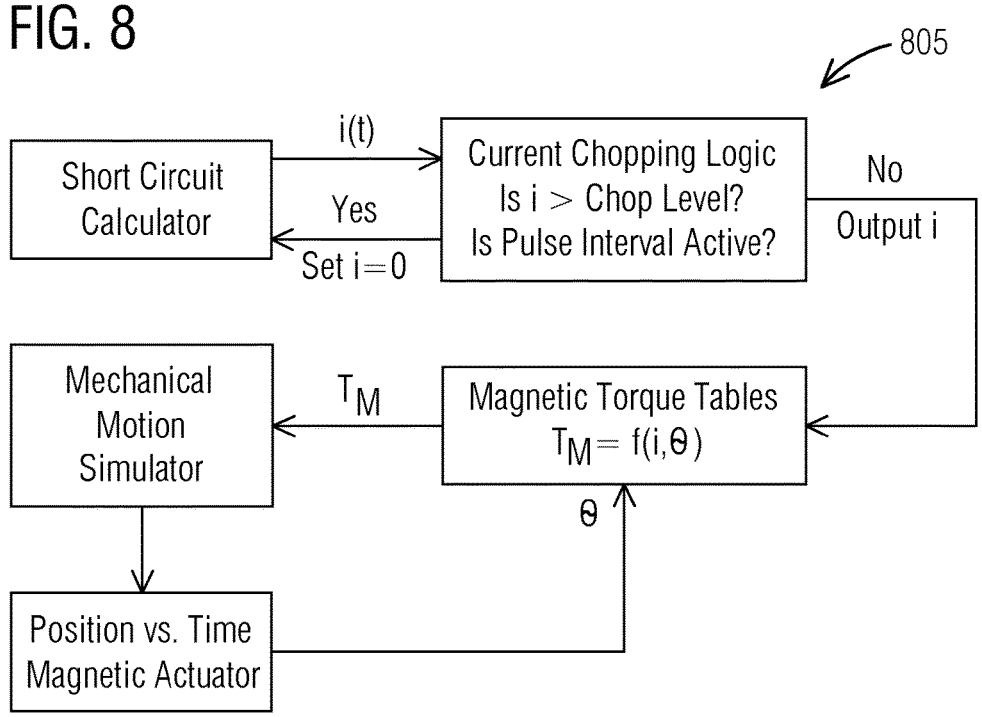
FIG. 8 is an overview of a system simulator used to predict behavior of a MCB downstream of a SSCB in accordance with an exemplary embodiment of the present invention.

With regard to FIG. 8, it is an overview of a system simulator 805 used to predict behavior of a MCB 110(1) downstream of a SSCB such as 107. Via computation, it was determined how the MCB 110(1) would respond to chopped current let through by the SSCB 107, under a variety of scenarios.

Figure 9A:
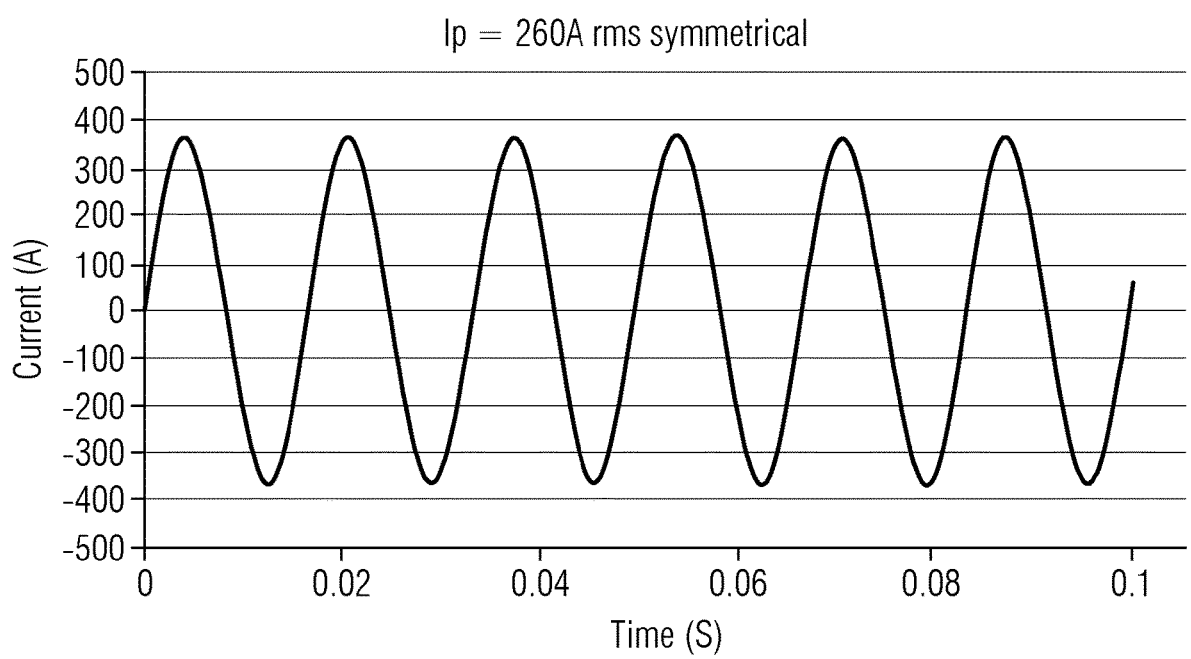
FIG. 9A-9D show example results of the system simulator of FIG. 8 in accordance with an exemplary embodiment of the present invention.
Figure 9B:
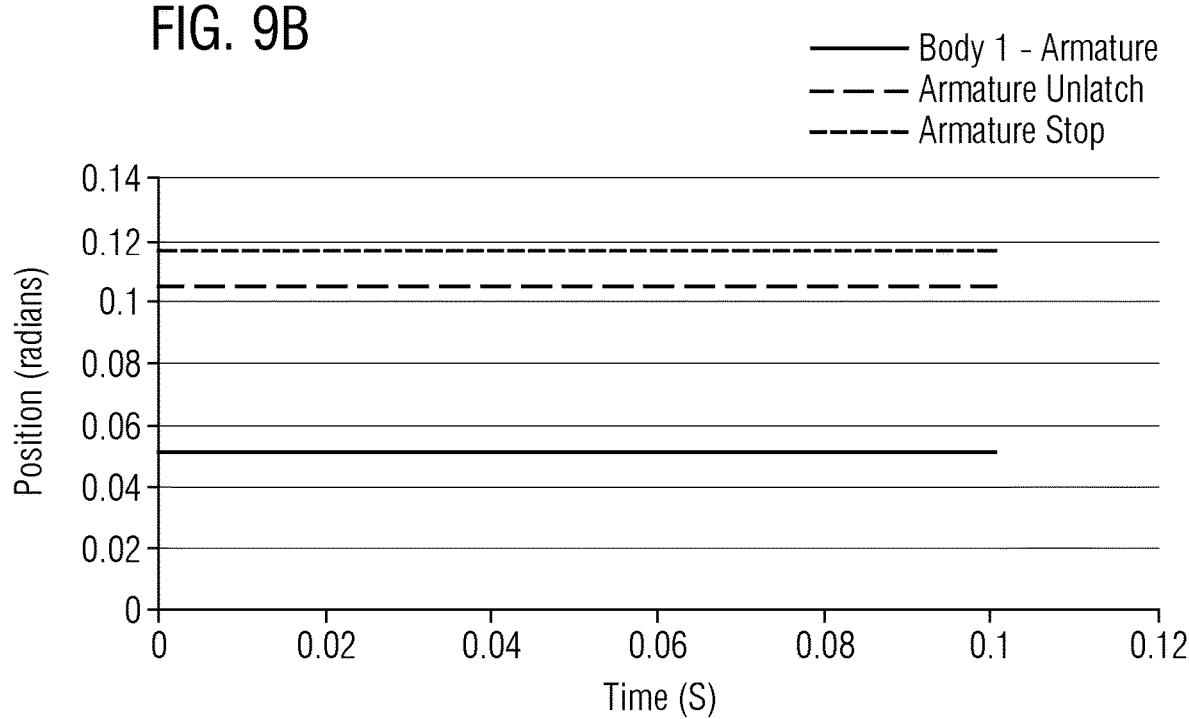
Figure 9C:
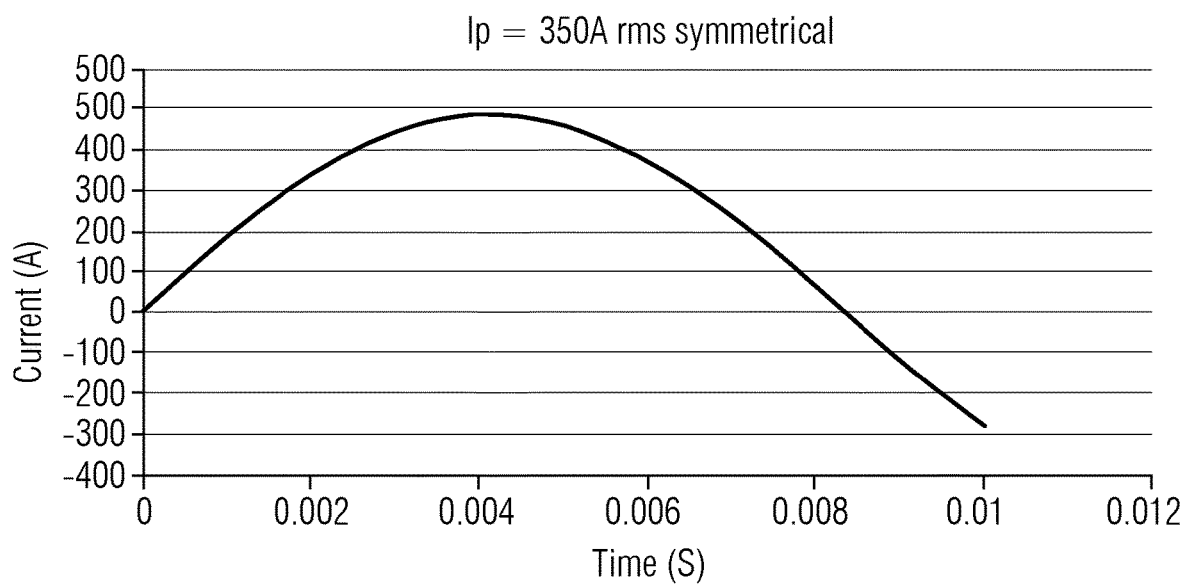
Figure 9D:
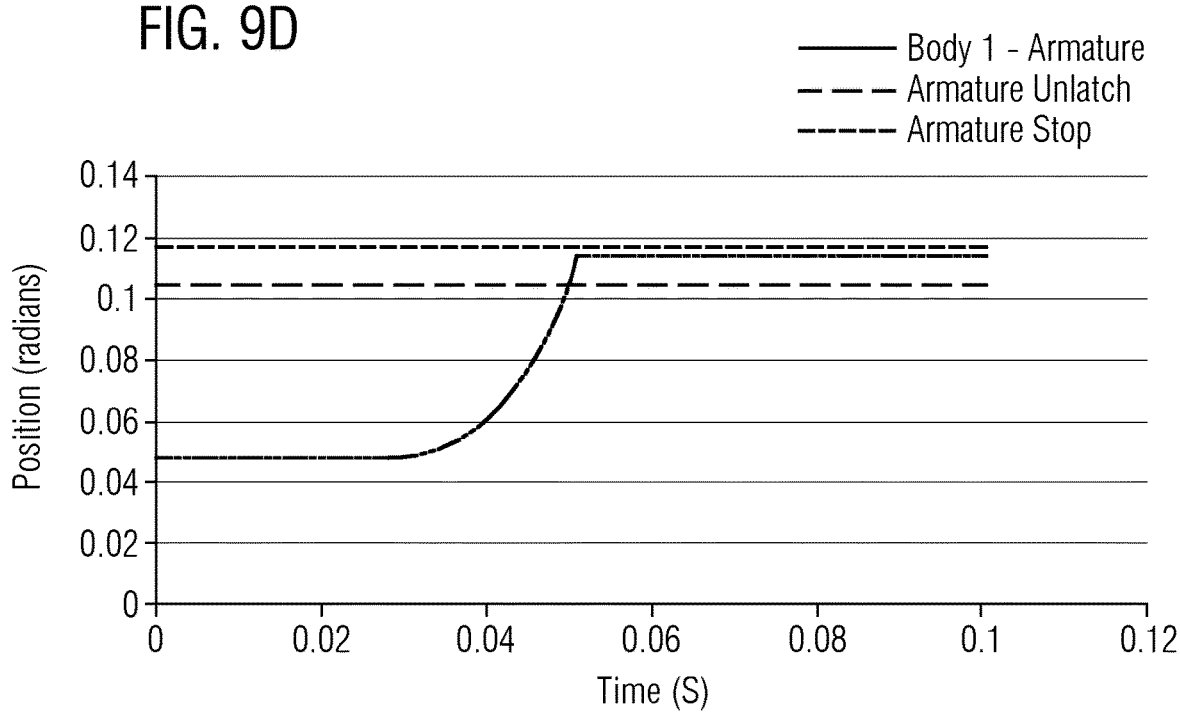
Figure 10A:
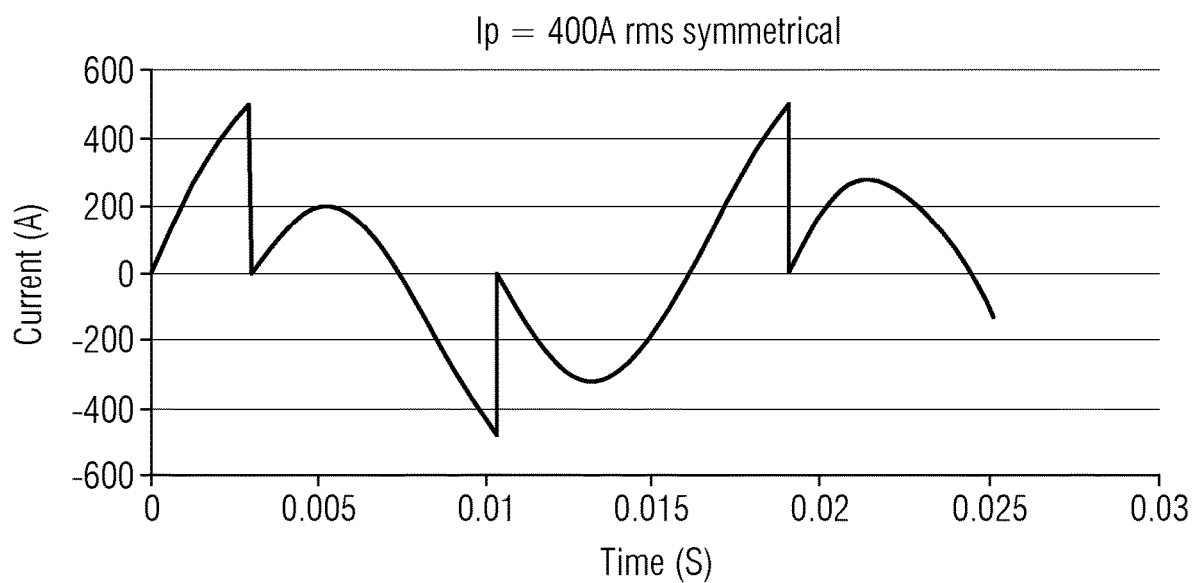
Figure 10B:
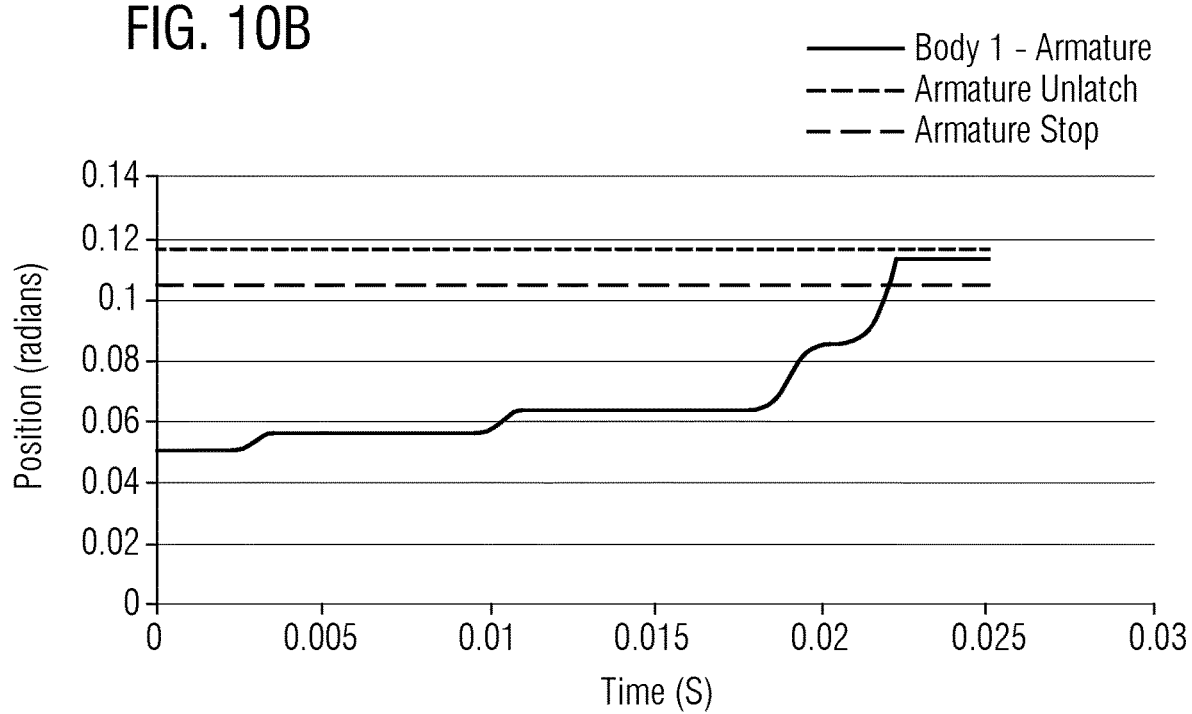
Figure 11A:
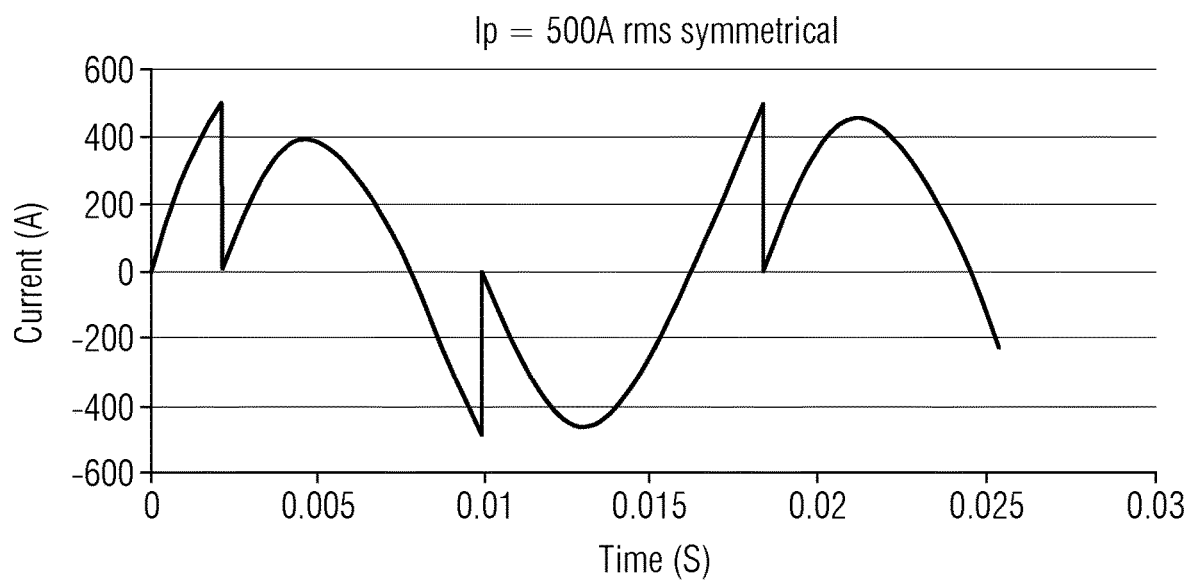
Figure 11B:
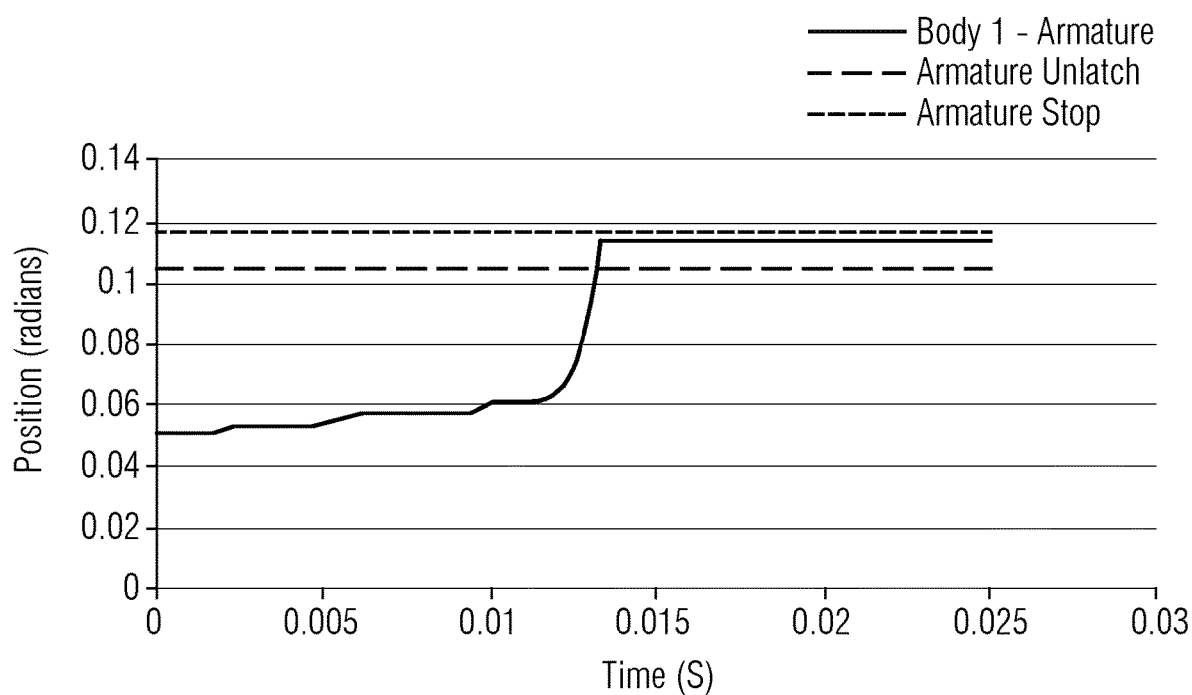
Figure 12A:
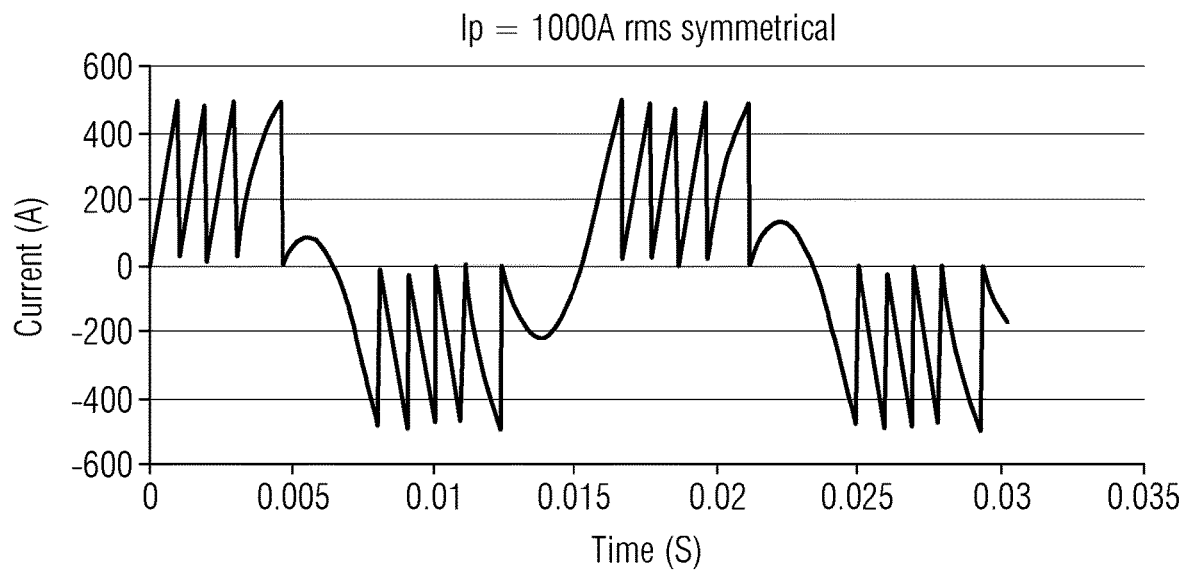
Figure 12B:
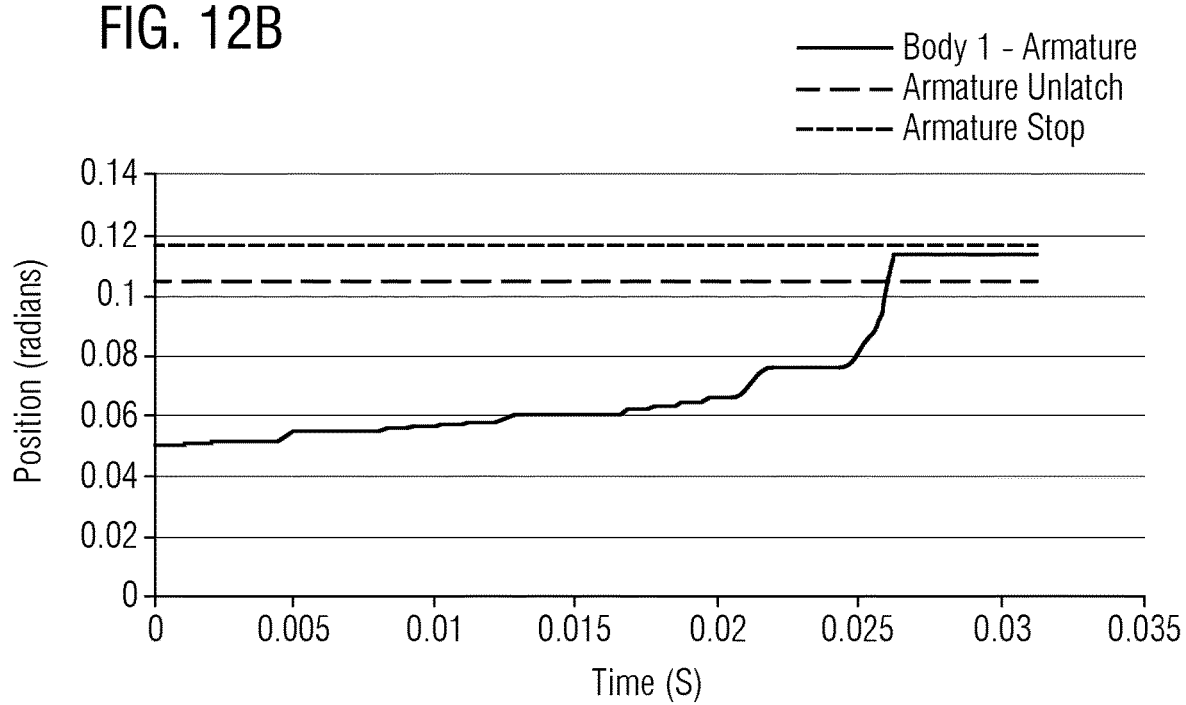
Figure 13A:
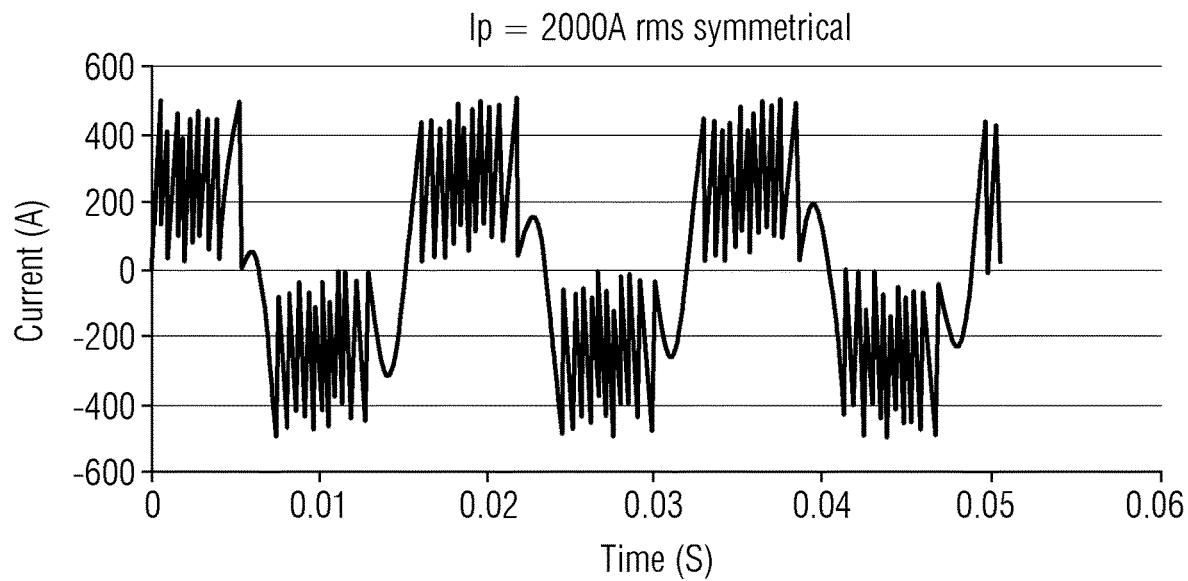
Figure 13B:
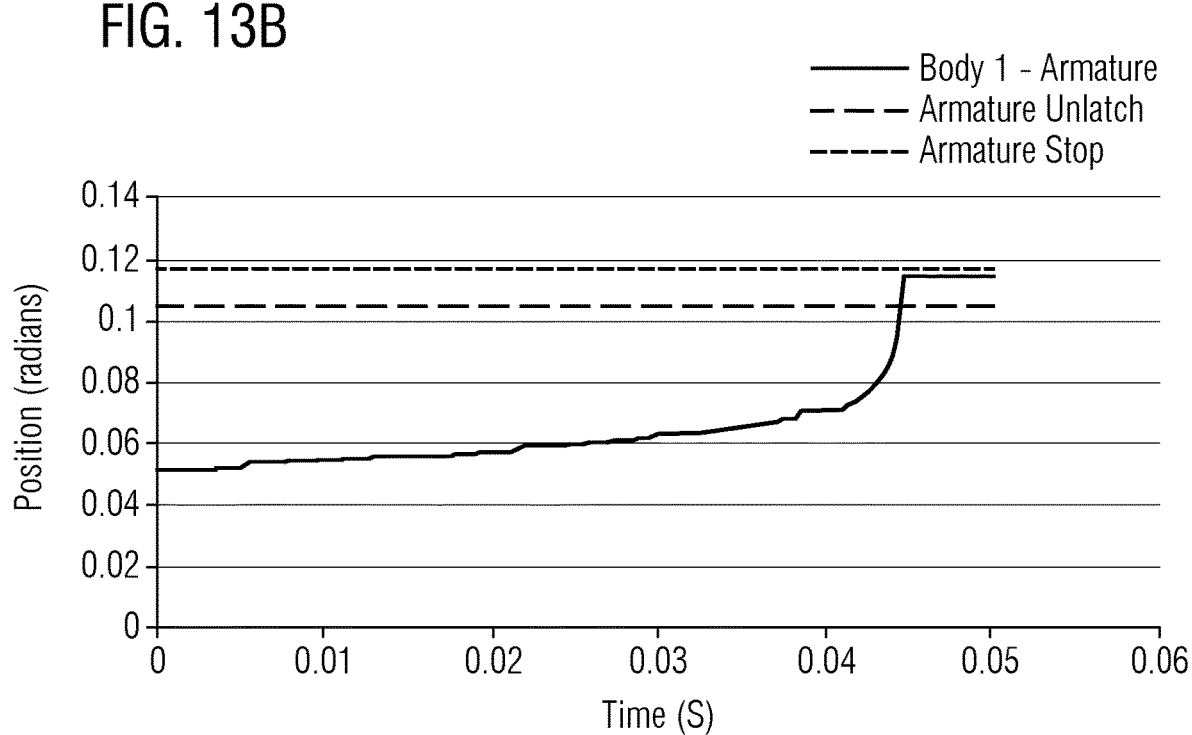
Figure 14A:
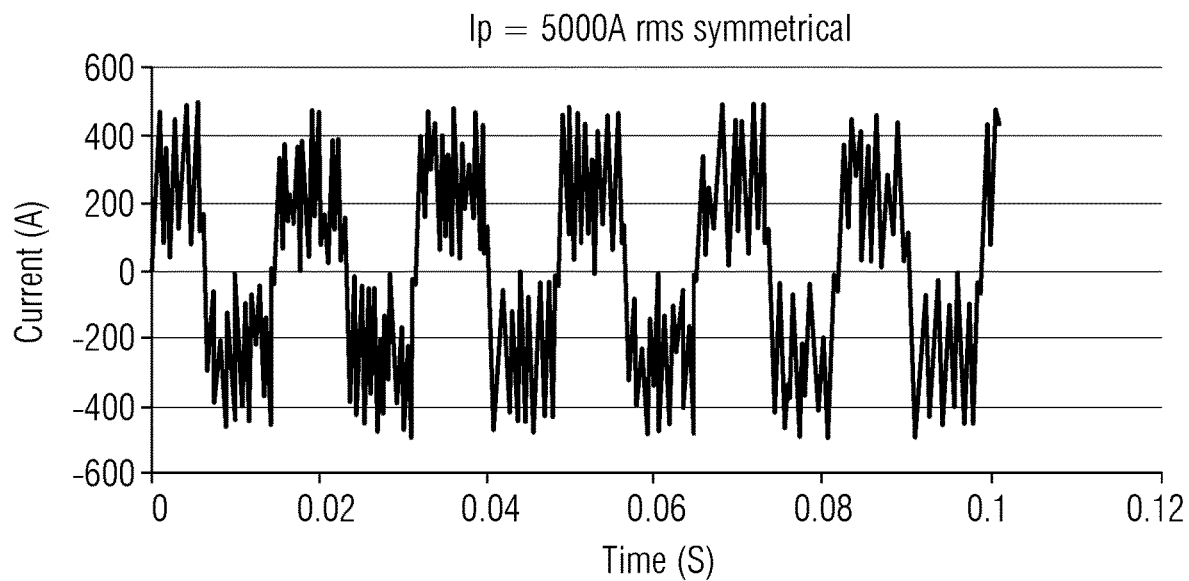
Figure 14B:
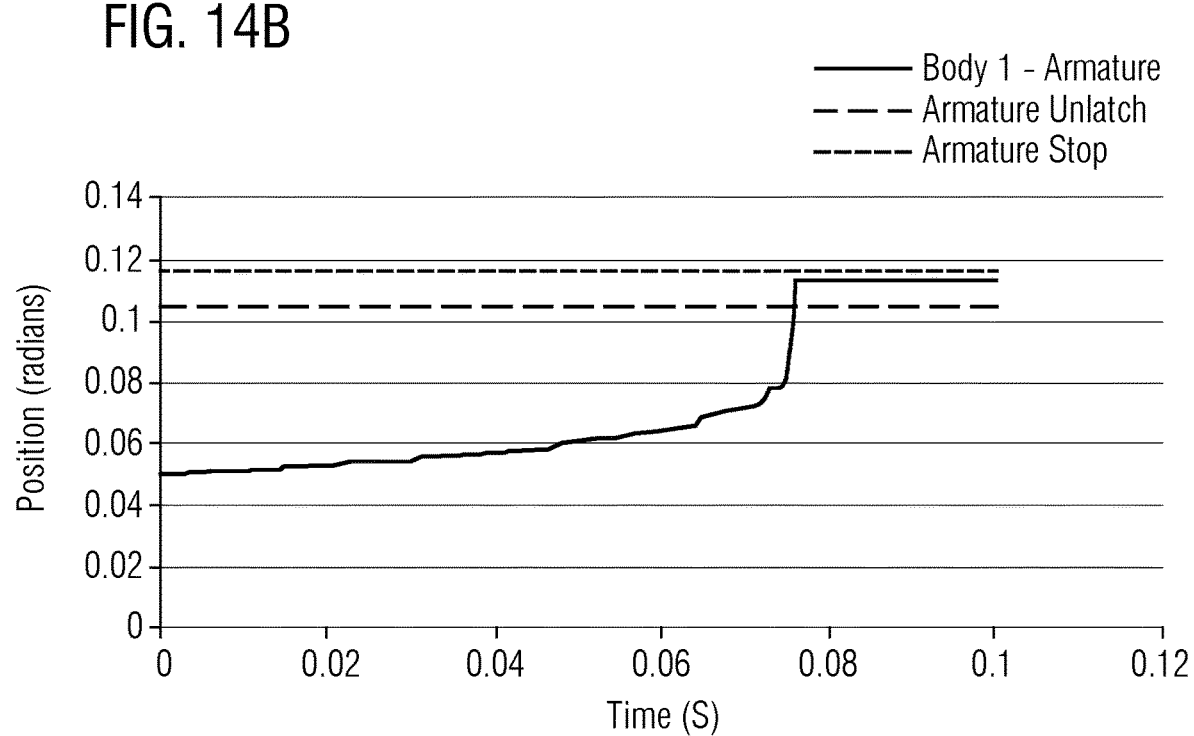
Figure 15A:
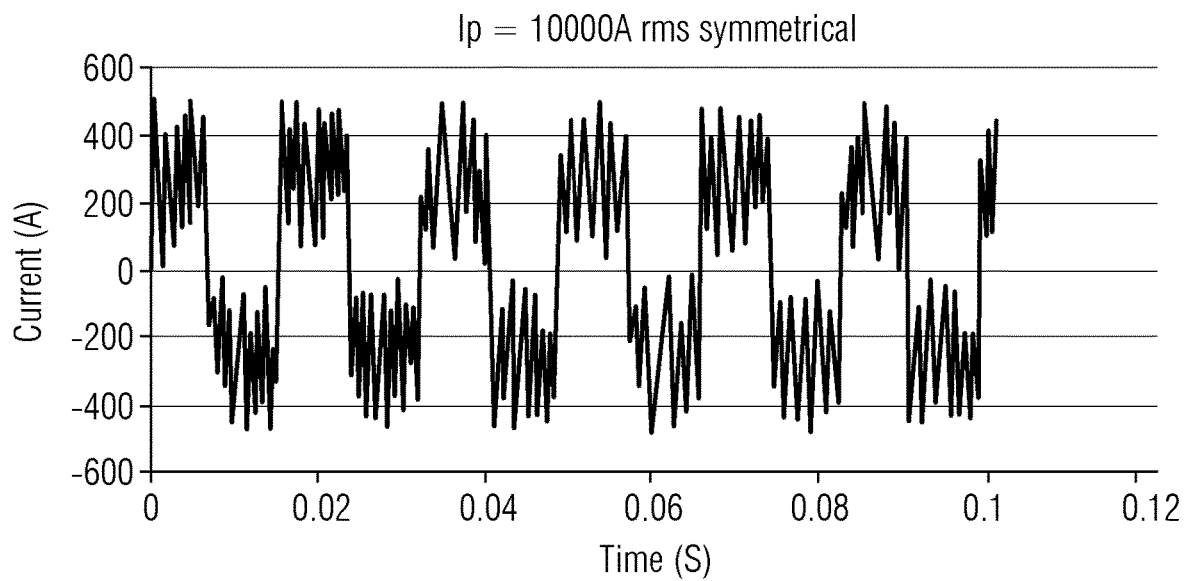
Figure 15B:
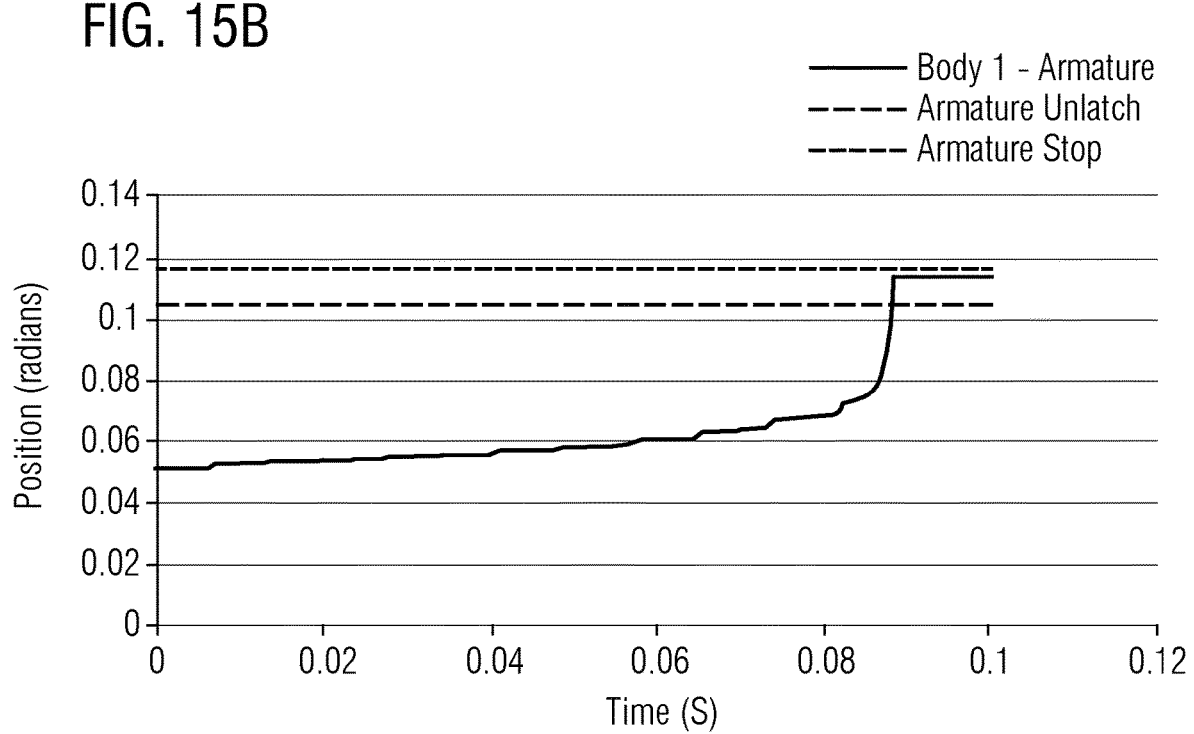

With respect to FIGS. 9A-9D, they show example results of the system simulator 805 of FIG. 8. FIG. 9A shows current below the chop level 150, so it is sinusoidal. A phase closing angle has been selected to produce a symmetric sinusoid. FIG. 9B shows the magnetic actuator motion (solid line) of the MCB 110(1) from the current in FIG. 9A. Magnetic force is insufficient to move the actuator 610. FIG. 9C shows current just below the chop level 150. FIG. 9D shows magnetic actuator motion (solid line) from the current in FIG. 9C. This figure shows that the MCB 110(1) trips. The long-dashed line is the unlatching point of the actuator 610. The short-dashed line is where the actuator 610 strikes against the magnetic yoke 607 and stops.

In the following FIGS. 10A, 10B, 11A, 11B, 12A, 12B, 13A, 13B, 14A, 14B through FIG. 15A, 15B, simulation results are shown for circuits with progressively increasing prospective currents. In each of these cases, for consistency, phase closing angles are chosen to achieve symmetric currents. In general, if worst case asymmetric closing angles were chosen, results would be similar, except that chopping would occur at smaller prospective currents. These simulations do not include any pulse interval. For the higher prospective currents 2000 to 10000 A, the chopped current in the figures appears to not chop to zero nor reach 500 A. This is only an illusion, because not every point of the simulation is plotted. The simulations often had over 1 million time steps, and this was too many to plot in Excel software. These simulations show that with chopped current, the MCB 110(1) can be caused to trip over a range of prospective from its normal threshold all the way to 10 kA.

Figure 16:
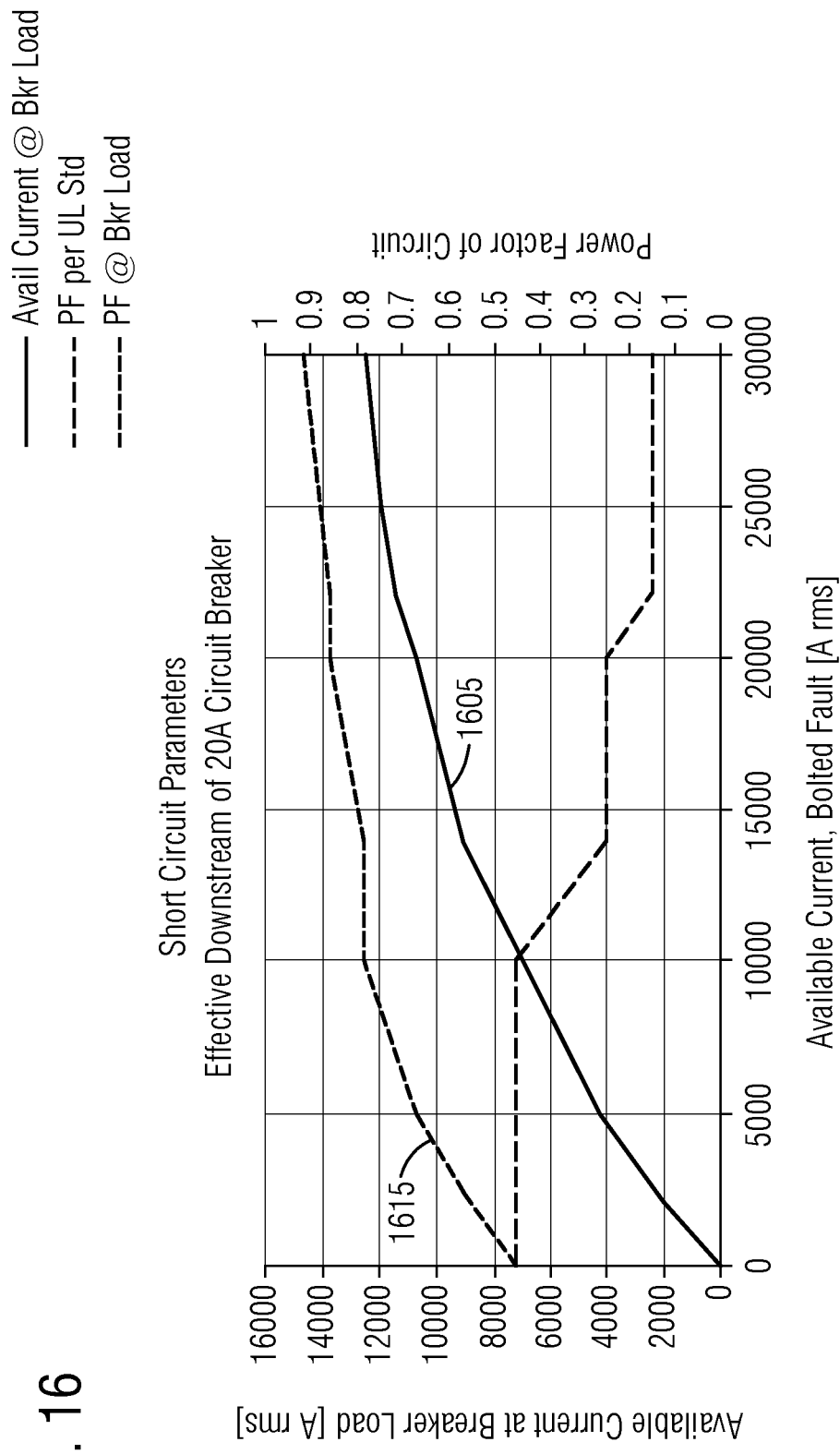
FIG. 16 shows the relationship between the available current of a bolted fault and the effective available current downstream of a MCB in our example distribution system with SSCB as main breaker in accordance with an exemplary embodiment of the present invention.

FIG. 16 shows the relationship between an available current 1605 of a bolted fault and the effective available current downstream of the MCB 110(1) in our example distribution system with the SSCB 107 as main breaker. When circuit breakers are tested in a high power test laboratory according to UL489, the actual current that flows through the breaker is significantly less than value of the nominal calibrated circuit. This is because circuits are calibrated with a bolted shorting bar. But actual short circuit tests of a circuit breaker include additional resistance. In this chart, additional resistance was added to the circuit to account for resistance across the SSCB 107 semiconductor junctions 135, the resistance of a bimetal in the MCB 110(1), and 4 feet of #12AWG cable. Likewise, the additional resistance increases an effective power factor 1610 at the breaker load, as shown in the chart. Also see a power factor 1615 per UL Std in the chart.

The significance of this chart is that it extends the usable range of selectivity of the present invention. For example, it was demonstrated that with 6937 A available current at the breaker load, the MCB 110(1) can be made to trip on chopped current with a chopping level of 500 A, this means that selectivity is achieved for a 10,000 A available bolted fault current. It can then be claimed that selectivity is achieved for a 10 kA circuit.

Figure 17:
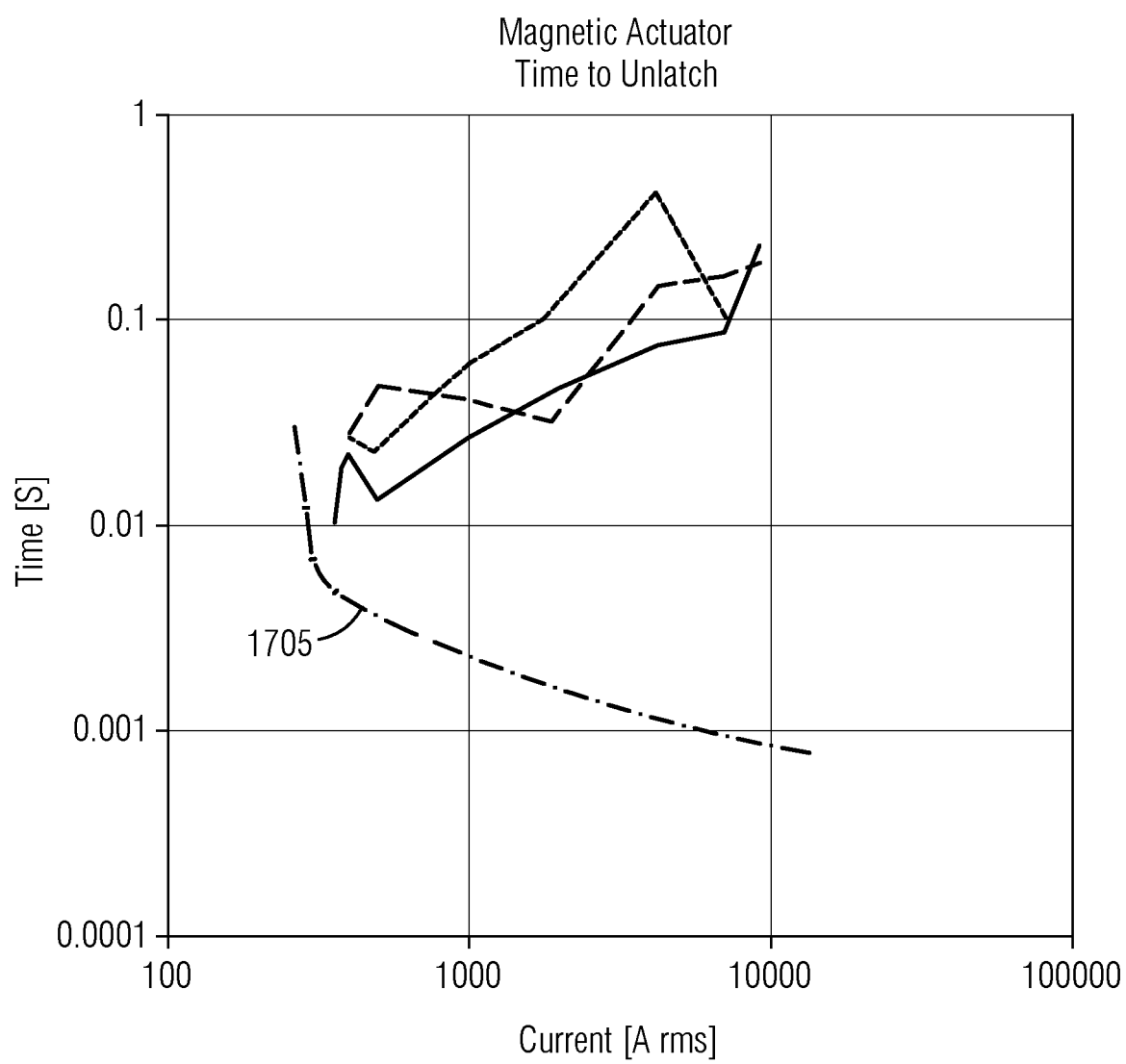
FIG. 17 shows a summary of tripping time results in on a log-log chart, which is the format commonly used for time-current curves in accordance with an exemplary embodiment of the present invention.

FIG. 17 shows a summary of tripping time results in on a log-log chart, which is the format commonly used for time-current curves. But in this case, only the parts of the tripping curve are shown for the magnetic release. Tripping from the thermal release (bimetal) at lower currents and longer times is not shown.

The x-axis shows actual RMS current through the MCB 110(1), not the prospective current of a bolted fault. In these simulations a symmetrical current was used. In each case, a voltage phase closing angle was chosen that produced symmetrical current. The relationship between prospective current and resulting current through the MCB 110(1) is shown in FIG. 16.

A long-dashed line 1705 represents a MCB acting alone, without any current chopping from an upstream SSCB. It follows the usual inverse-time/current relationship that is expected of a thermal/magnetic circuit breaker.

The other three curves show the time/current relationship that can be expected of a MCB subjected to chopped current according to the different variations of the present invention. It is a positive slope relationship. As the available current increases, the individual pulses of chopped current become shorter in duration, and more pulses are required to move the MCB magnetic actuator 610 and overcome latch friction.

The advantages arise from using a SSCB as an upstream breaker in a selectivity system.

Even when the downstream breaker trips on chopped current, very little let-through energy reaches the load 125. The current never rises above the chop level 150. In our example system, on a 5 kA prospective short circuit, the MCB 110(1) would see no more than 500 A. Whereas, the same MCB in a conventional distribution system would see a peak current of nearly 6000 A.

There will be little arcing in the downstream breaker from short circuits, regardless of the level of prospective current. There will be some arcing from routine ON/OFF operations at normal load current and low-level overloads, so the breaker must meet its conventional load endurance and overload operations capability. However, the downstream breaker will no longer be subjected to damaging high short circuit currents. Typically, electrical contacts must be sized to withstand erosion from the worst short circuit currents. A high-level short circuit significantly reduces the life of the electrical contacts. But with an SSCB upstream, the life and reliability of conventional circuit breakers will be extended. The need for maintenance or replacement of breakers after short circuit events will be greatly reduced.

Even though the downstream MCB 110(1) carries a 5 to 10 kA interruption rating, the interrupting ability of the downstream device is no longer needed, except to meet standards that were developed for technology prior to SSCBs. In the future, lower cost downstream devices can be developed for use in selective distribution systems. For example, the arc plate assemblies might be omitted, contact breaking distances reduced, and simpler spring mechanisms used.

The following statements define a set-up for the present invention:
1. There is a SSCB.
2. The SSCB provides overcurrent protection by use of a power electronic component that stops the flow of current.
3. The SSCB and a second switching device are wired in series.
4. The SSCB is upstream—electrically nearer the power source—and the second switching device is downstream—electrically nearer the load.
5. The second switching device has a magnetic overcurrent release and it may have other types of releases.
6. The magnetic release of the second switching device has maximum overcurrent tripping ability that is greater than the continuous current rating of the SSCB.
7. The SSCB is able to allow current to flow momentarily up to a chop level that is higher than the current rating of the second switching device.
8. The chop level is higher than the minimum current needed to cause motion of the magnetic actuator of the second switching device.
9. In an overcurrent situation, the SSCB passes repeated pulses of current, if the overcurrent exceeds the chop level.
10. In an overcurrent situation, the SSCB protects itself by chopping the repeated current pulses to zero, whenever the current rises to the chop level.
11. In some overcurrent situations, when the fault is downstream of the second switching device, the repeated pulses passed by the SSCB will eventually cause the second switching device to trip.

Figure 18:
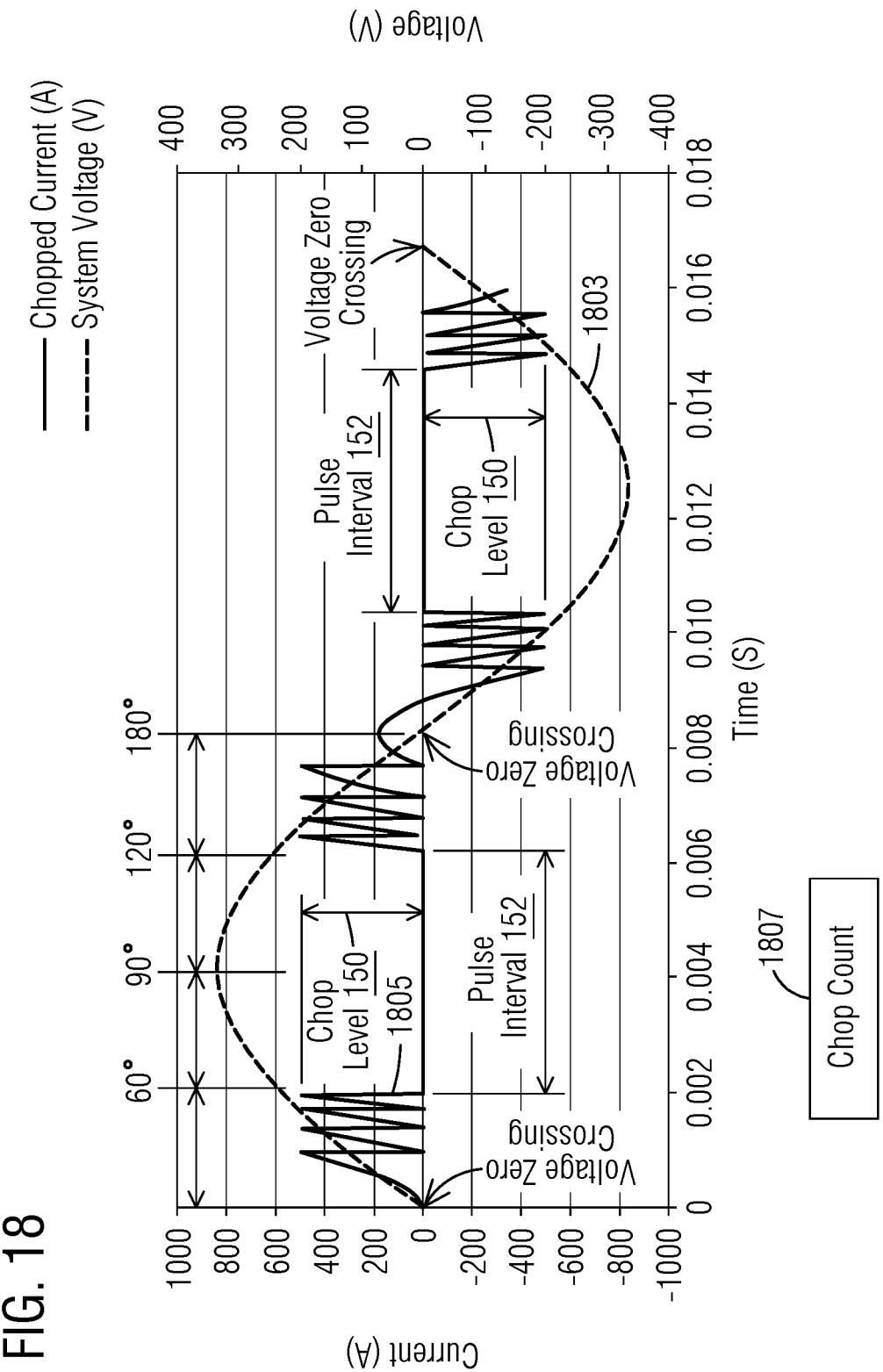
FIG. 18 shows current chopping which has been optimized according to the system voltage waveform in accordance with an exemplary embodiment of the present invention.
Figure 19A:
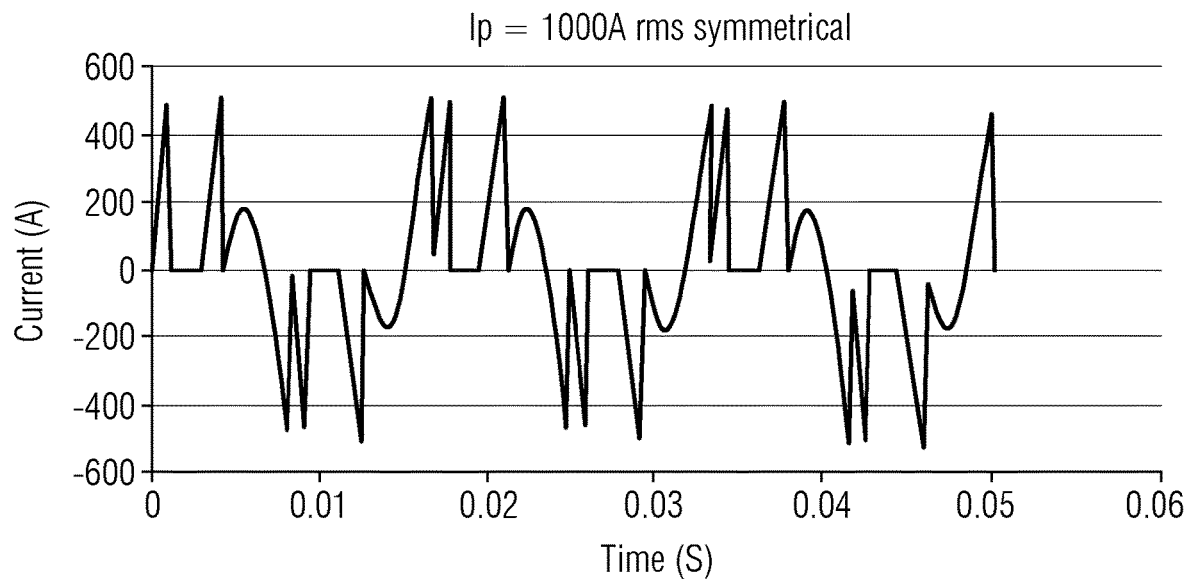
Figure 19B:
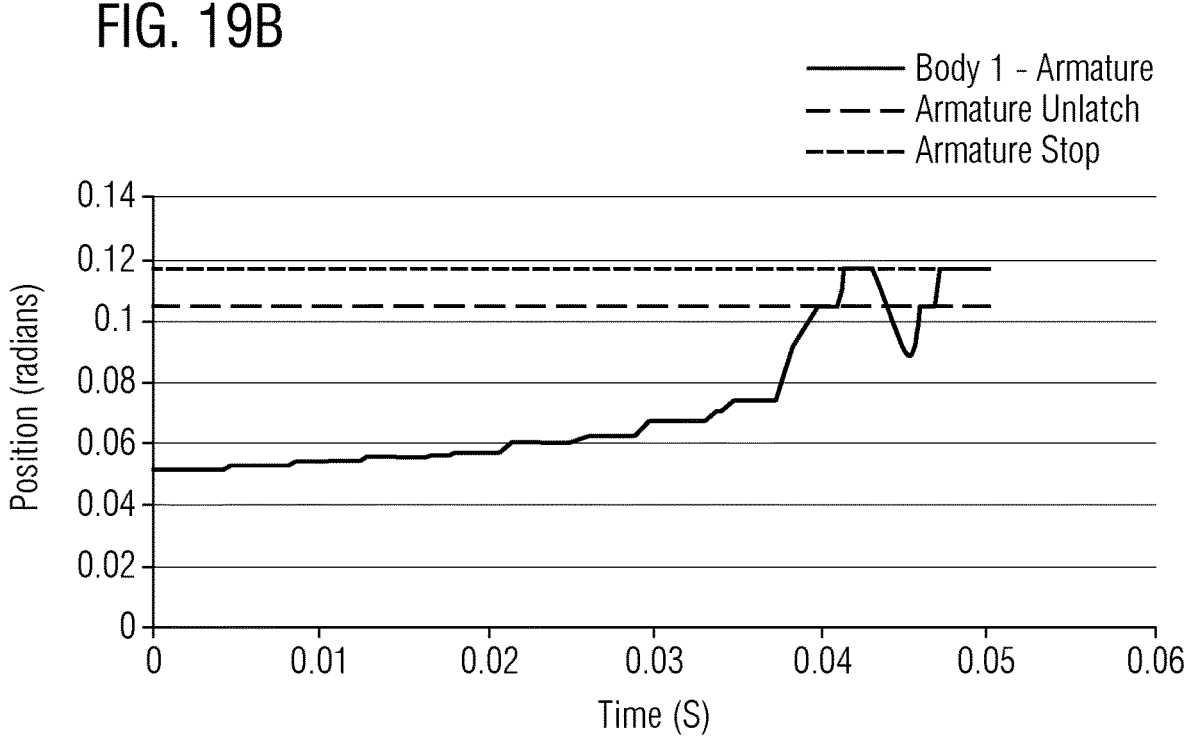
Figure 20A:
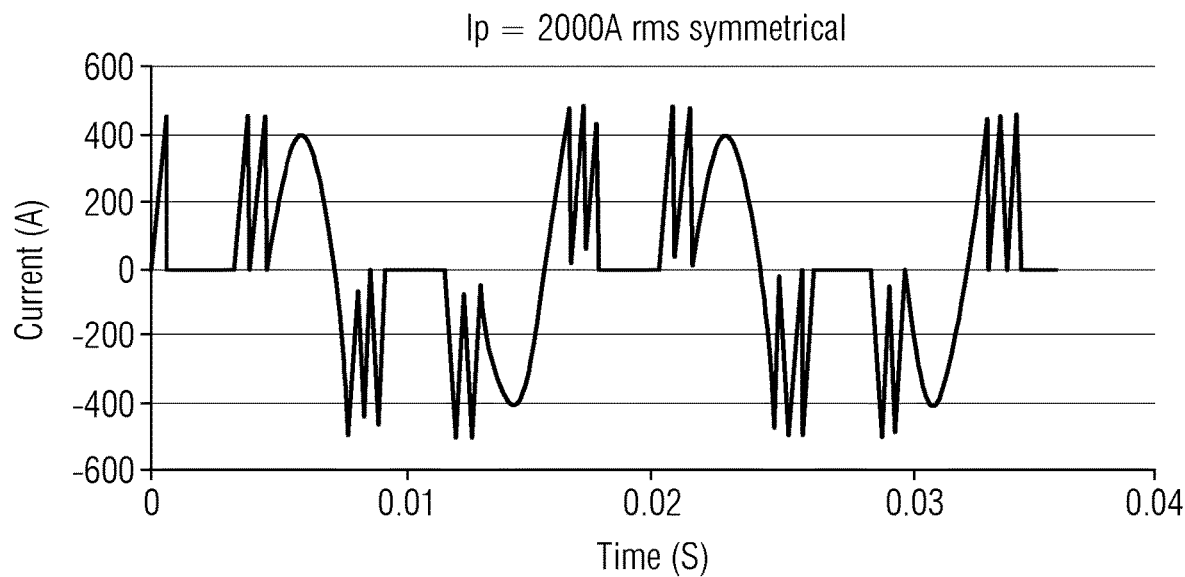
Figure 20B:
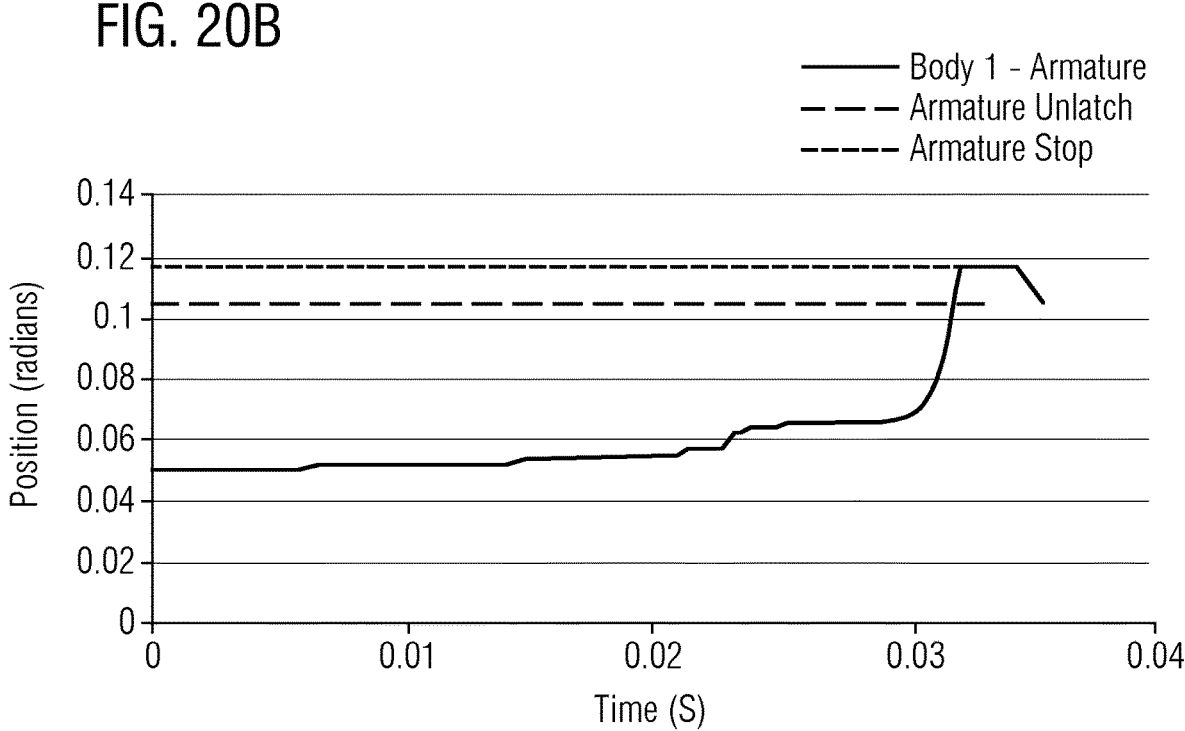
Figure 21A:
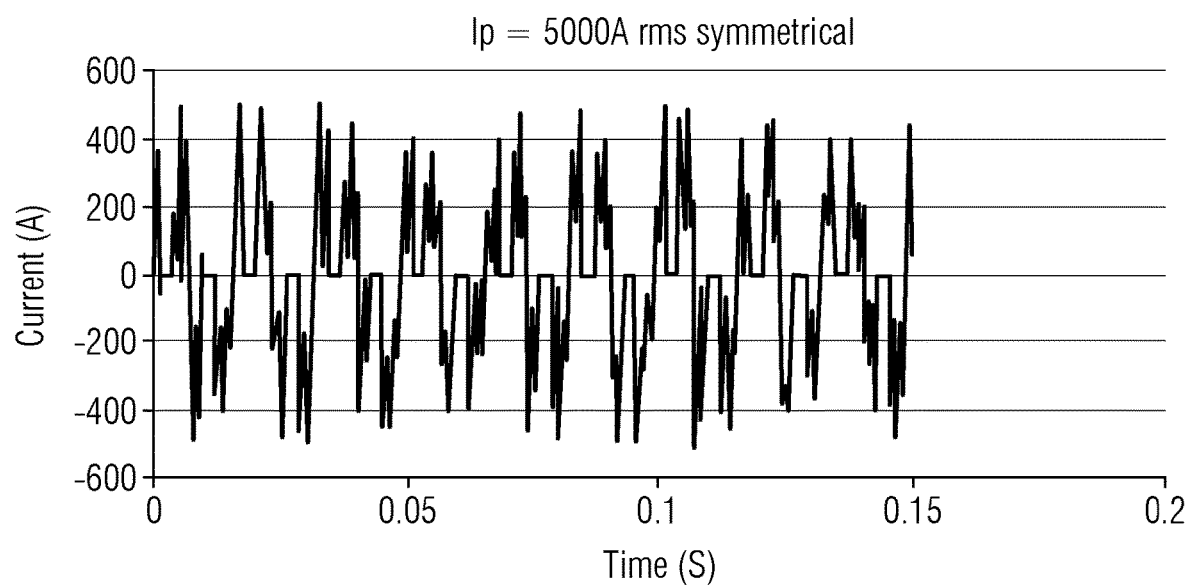
Figure 21B:
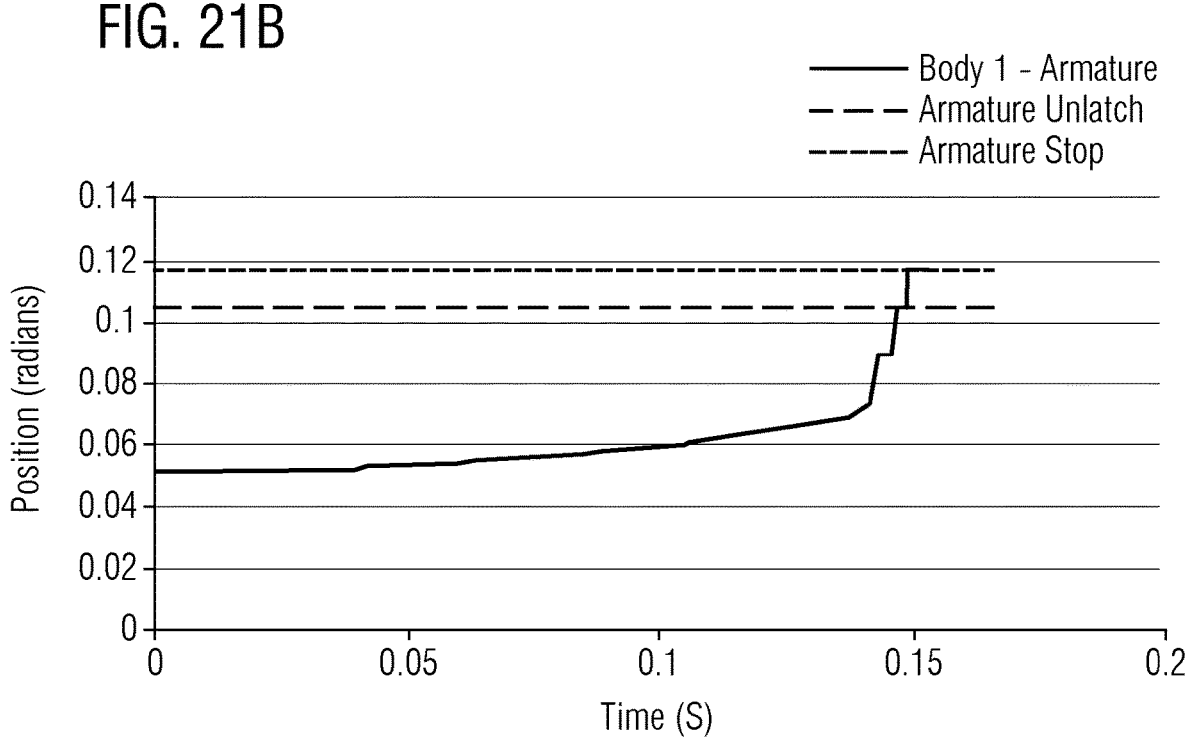
Figure 22A:
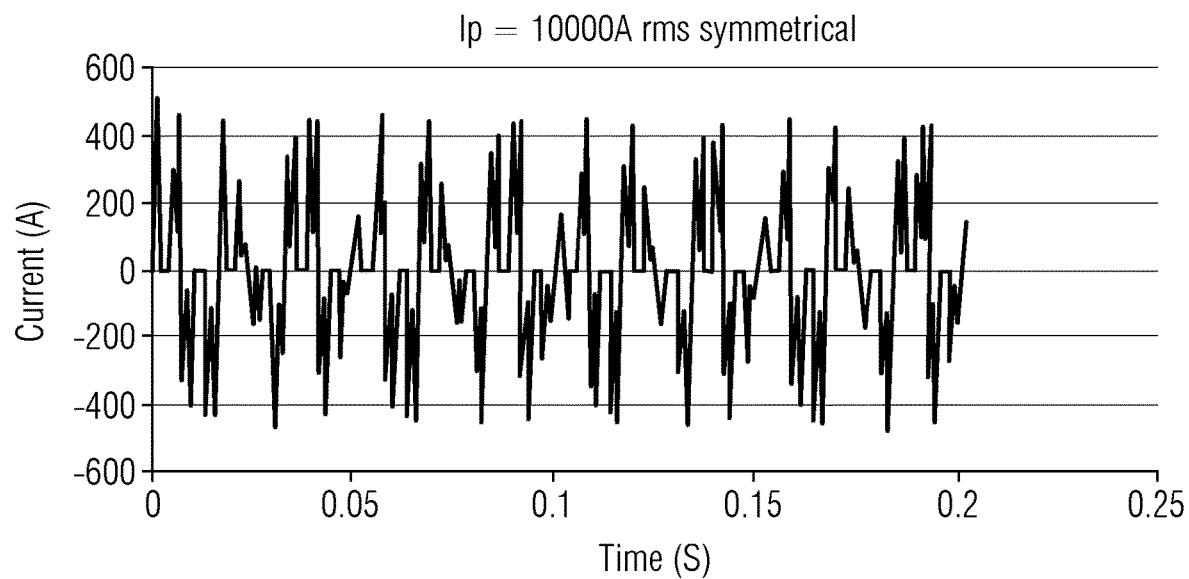
Figure 22B:
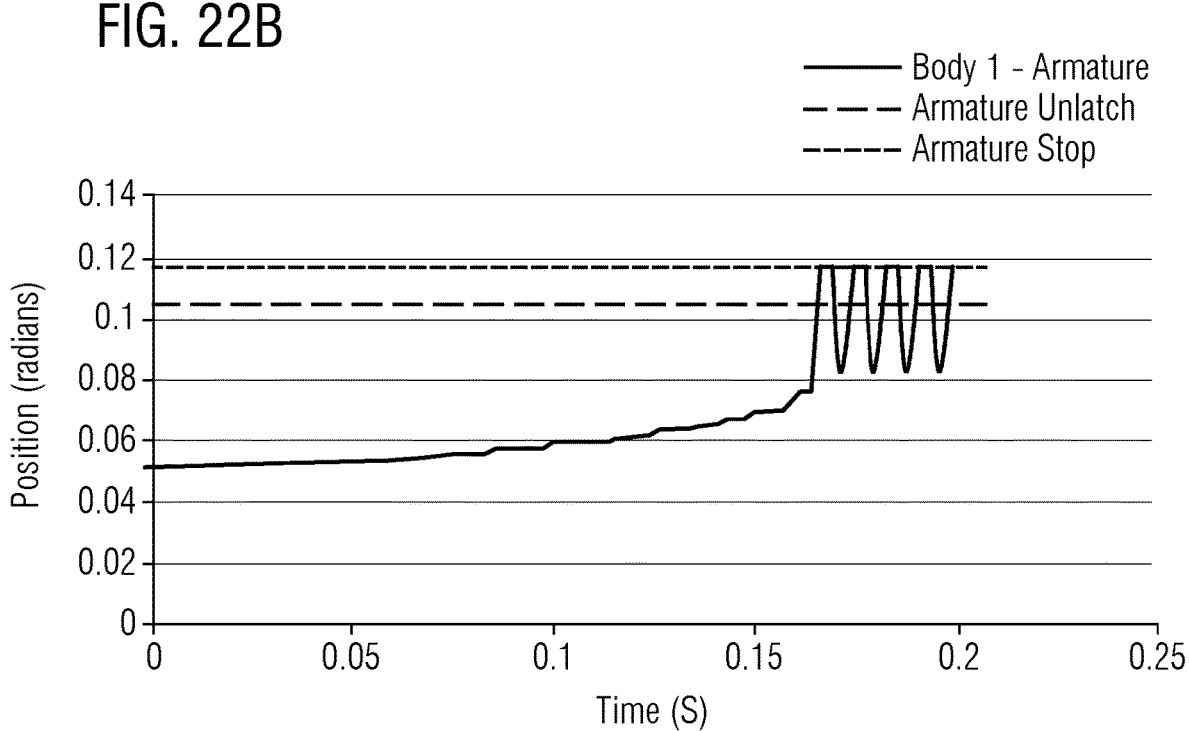

FIG. 18 shows current chopping which has been optimized according to a system voltage waveform 1803 in accordance with an exemplary embodiment of the present invention. Pulses between 60° and 120° phase angle (and between 240° and 300°) have been removed and current remains at zero. These phase angles are by way of example to show the idea, but other angles might be chosen.

As FIG. 5 made evident, current pulses near the zero crossings of the voltage waveform 1803 have longer duration than pulses near the peak of the voltage waveform 1803. Pulses with longer duration are more effective at moving the magnetic actuator of the downstream branch breaker. Pulses with short duration not only are not as effective at moving the magnetic actuator, but also, they greatly increase the chop count. A chopped current 1805 with the characteristics of FIG. 18 has advantages of tripping the downstream breaker with a reduced chop count 1807 and spreading out the chop count 1807 over a longer time period to reduce temperature rise of the semiconductor junction of the SSCB 107.

In the FIGS. 19A, 19B, 20A, 20B, 21A, 21B through 22A, 22B, the chopped current has been modified to be "system voltage waveform optimized" as shown in FIG. 18. That is, no current pulses are initiated if the current is within 60° of either side of the voltage waveform peak. These figures show that the MCB 110(1) can still be caused to trip under these conditions. But in addition, FIG. 23 shows that the chop count 1807 is reduced, which provides a benefit for reducing heating in the SSCB 107.

The table of FIG. 23 shows advantages of maintaining current at zero in the vicinity of the peaks of the voltage waveforms.

Using the "system voltage waveform optimized" approach, the MCB 110(1) can be made to trip for the same range of prospective currents as "No interval between pulses".

For all prospective short circuit currents 1000 A and above, the chop count 1807 is reduced.

In every case, the chop density is reduced.

By maintaining current at zero in the vicinity of peaks of the voltage waveform 1803, advantage can be gained for reducing peak temperature in the SSCB 107 semiconductor junctions 135.

Figure 24:
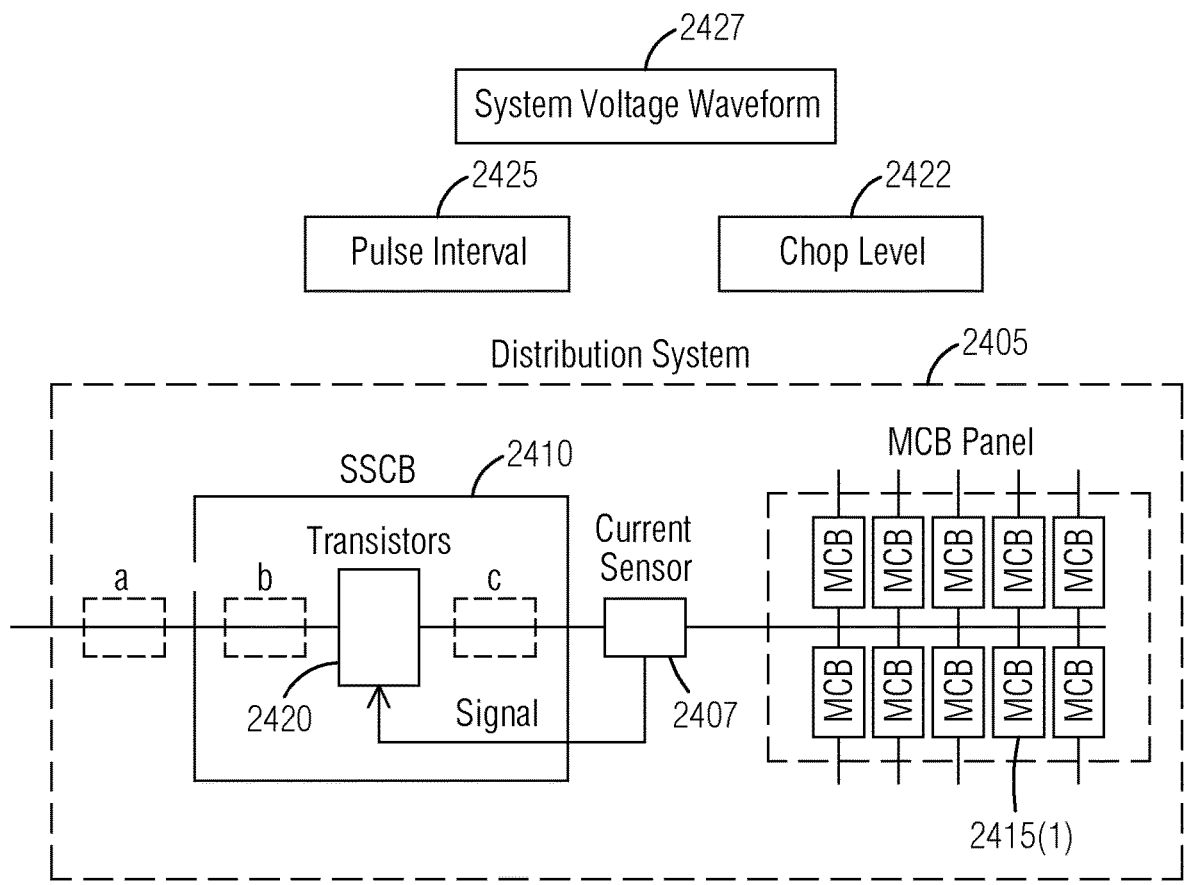
FIG. 24 shows a circuit breaker distribution system with a current sensing circuit or a current sensing device in accordance with an exemplary embodiment of the present invention.

FIG. 24 shows a circuit breaker distribution system 2405 with a current sensor 2407 (e.g., a current sensing circuit or a current sensing device). FIG. 24 shows a, b, and c as alternate locations for the current sensor 2407. The circuit breaker distribution system 2405 is configured to provide selective coordination. The system comprises a solid-state switch 2410 (e.g., a SSCB) disposed as a main or upstream breaker and a switch with an over current protection 2415(1) (e.g., a MCB) disposed as a branch or downstream breaker. The solid-state switch 2410 comprises transistors 2420 that are controllable to turn ON and OFF. The system further comprises the current sensor 2407 (e.g., a current sensing circuit or a current sensing device) that is configured to turn OFF and ON the solid-state switch 2410 which allows repeated pulses of current through to the branch or downstream breaker in an event of an overload or short circuit, chooses a maximum current limit for the solid-state switch 2410 as a switch OFF or a "chop" level 2422 such that the "chop" level 2422 is chosen higher than a rated current of the solid-state switch 2410 but low enough that the solid-state switch 2410 is not damaged from repeated pulses over a period of time needed to switch OFF the branch or downstream breaker and add a pulse interval 2425 which is optimized to a system voltage waveform 2427 in that chopped pulses tend to be longer and more effective for de-latching the branch or downstream breaker when they occur in vicinity of a zero crossing of the system voltage waveform 2427 and chopped pulses are shorter and less effective near peaks of the system voltage waveform 2427.

The solid-state switch 2410 further comprises a microcontroller including a processor and a memory and computer-readable logic code stored in the memory which, when executed by the processor, causes the microcontroller to: allow repeated pulses of current through to the branch or downstream breaker in an event of an overload or short circuit, choose a maximum current limit for the solid-state switch 2410 as a switch OFF or the "chop" level 2422 such that the "chop" level 2422 is chosen higher than a rated current of the solid-state switch 2410 but low enough that the solid-state switch 2410 is not damaged from repeated pulses over a period of time needed to switch OFF the branch or downstream breaker, and add the pulse interval 2425 which is optimized to the system voltage waveform 2427 in that chopped pulses tend to be longer and more effective for de-latching the branch or downstream breaker when they occur in vicinity of a zero crossing of the system voltage waveform 2427 and chopped pulses are shorter and less effective near peaks of the system voltage waveform 2427.

It is intended that the present invention may be applied not only in AC distribution systems, but also in DC distribution systems. Clearly, repeated pulses of current, limited by a chop level, may be used to trip a downstream breaker in DC applications also. In both cases, the chop level is chosen higher than a rated current of the SSCB, higher than the current necessary to move the magnetic armature of the downstream breaker, and low enough that the SSCB is not damaged.

In fact, the present invention may in some situations provide an advantage in DC cases for tripping a downstream breaker. Often, magnetic tripping devices benefit from the repeated vibrations caused by AC current. The repeated vibrations sometimes assist in causing the device to unlatch. But in DC applications, the magnetic armature experiences only one application of the force. Sometimes this does not produce enough motion to unlatch the breaker. In such cases the breaker might be assigned a different trip rating than AC, or the DC version of the breaker might have a different construction than the AC version. But the repeated pulses of the present invention might produce tripping behavior in DC applications similar to AC applications, thus improving consistency and reducing the need for rerating or special constructions.

Whereas it was stated that for AC applications the present invention will have pulses of varying rate-of-rise and time duration, this is not the case in DC applications. Since rate-of-rise and pulse time duration depend on the instantaneous value of the system voltage, and for DC applications the system voltage is constant, then in DC applications the present invention will have non-variable repeating pulses, all with identical rate-of-rise and time duration.

In DC applications, it may still be beneficial to add a pulse interval. The pulse interval will reduce the heating in the electronic switching components. However, the concept of a pulse interval that is optimized to the system-voltage waveform does not apply in DC applications.

Figure 25:
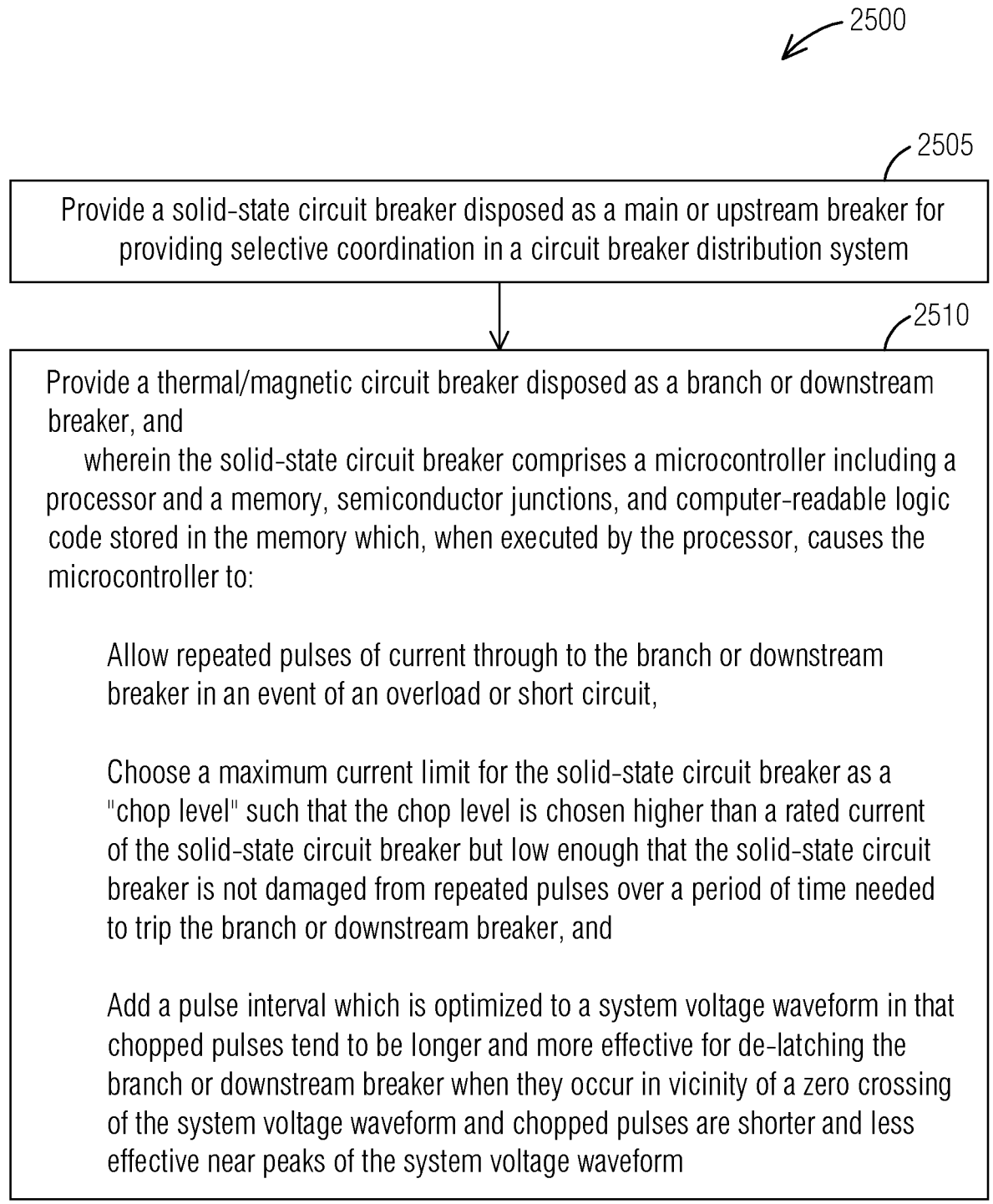
FIG. 25 illustrates a schematic view of a flow chart of a method of providing selective coordination in a circuit breaker distribution system in accordance with an exemplary embodiment of the present invention.

FIG. 25 illustrates a schematic view of a flow chart of a method 2500 of providing selective coordination in the circuit breaker distribution system 105 in accordance with an exemplary embodiment of the present invention. Reference is made to the elements and features described in FIGS. 1-24. It should be appreciated that some steps are not required to be performed in any particular order, and that some steps are optional.

The method 2500 comprises a step 2505 of providing a solid-state circuit breaker disposed as a main or upstream breaker. The method 2500 further comprises a step 2510 of providing a magnetic circuit breaker disposed as a branch or downstream breaker. The solid-state circuit breaker comprises a microcontroller including a processor and a memory, semiconductor junctions, and computer-readable logic code stored in the memory which, when executed by the processor, causes the microcontroller to: allow repeated pulses of current through to the branch or downstream breaker in an event of an overload or short circuit, choose a maximum current limit for the solid-state circuit breaker as a "chop level" such that the chop level is chosen higher than a rated current of the solid-state circuit breaker but low enough that the solid-state circuit breaker is not damaged from repeated pulses over a period of time needed to trip the branch or downstream breaker, and add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform.

A circuit breaker distribution system is configured to provide selective coordination such that the system comprises a solid-state switch disposed as a main or upstream breaker and a switch with an over current protection disposed as a branch or downstream breaker. The solid-state switch comprises a microcontroller including a processor and a memory, and computer-readable logic code stored in the memory which, when executed by the processor, causes the microcontroller to: allow repeated pulses of current through to the branch or downstream breaker in an event of an overload or short circuit, choose a maximum current limit for the solid-state switch as a switch OFF or a "chop" level such that the "chop" level is chosen higher than a rated current of the solid-state switch but low enough that the solid-state switch is not damaged from repeated pulses over a period of time needed to switch OFF the branch or downstream breaker and adds a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform.

While a circuit breaker distribution system for a SSCB and a MCB is described here a range of one or more other breakers or other forms of breakers are also contemplated by the present invention. For example, other types of breakers may be implemented based on one or more features presented above without deviating from the spirit of the present invention.

The techniques described herein can be particularly useful for a logic of the SSCB that is to be programmed. While particular embodiments are described in terms of a logic of the SSCB that is to be programmed, the techniques described herein are not limited to such a set-up but can also be used with other set-ups.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention.

While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A circuit breaker distribution system configured to provide selective coordination, the system comprising:
    a solid-state circuit breaker disposed as a main or upstream breaker; and
    a magnetic circuit breaker disposed as a branch or downstream breaker, and
    wherein the solid-state circuit breaker comprises a microcontroller including a processor and a memory,
    semiconductor junctions, and
        computer-readable logic code stored in the memory which, when executed by the processor, causes the microcontroller to:
        allow repeated pulses of current through to the branch or downstream breaker in an event of an overload or short circuit,
        choose a maximum current limit for the solid-state circuit breaker as a "chop level" such that the chop level is chosen higher than a rated current of the solid-state circuit breaker but low enough that the solid-state circuit breaker is not damaged from repeated pulses over a period of time needed to trip the branch or downstream breaker,
        add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform, wherein a width of each current pulse is not controlled, but rather the width follows naturally from the starting of the rise of current to the maximum peak current and a time required to reduce it to zero,
        use a phase angle of the system voltage waveform as a criterion for beginning and ending the pulse interval such that the pulse interval begins at 60 degrees after a zero crossing and ends at 120 degrees after a zero crossing,
            wherein the current remains at zero between 60 and 120 degrees after a zero crossing, and
            wherein a length of the pulse interval may be tuned by adjusting 60 and 120 degree phase angles to different angles.

2. The circuit breaker distribution system of claim 1, wherein the solid-state circuit breaker is arranged in a hierarchical manner such that the main or upstream breaker feeds power to the branch or downstream breaker,
    wherein the branch or downstream breaker feeds power to either end loads or to further smaller branch breakers, wherein when a fault occurs, only a circuit breaker which is immediately upstream of the fault will trip thus limiting an interruption of power to only that part of a circuit which is experiencing a problem, for example, if a fault occurs at an end load, only the branch or downstream breaker of that circuit should trip, and not the main or upstream breaker, wherein in an event of an overcurrent condition which causes the solid-state circuit breaker to stop the current at the chop level, the repeated pulses of overload or short circuit current are subsequently delivered to a downstream circuit, and wherein the chop level is chosen high enough that a magnetic actuator in the branch or downstream breaker has sufficient force to actuate tripping in a downstream device, but low enough that repeated momentary peaks of current do not damage the semiconductor junctions of the solid-state circuit breaker.

3. The circuit breaker distribution system of claim 2, wherein the solid-state circuit breaker passes chopped current when the system voltage waveform has a phase angle plus or minus 60° of system voltage zero but for rest of the system voltage waveform when the phase angle is within plus or minus 30° of peak voltage then the solid-state circuit breaker remains in an OFF state and passes no current.

4. The circuit breaker distribution system of claim 3, wherein the repeated pulses are to be continued for a specified delay period being a preset length of time called a selectivity delay which gives the branch or downstream breaker time to trip, wherein the pulse interval allows the selectivity delay to be increased without increasing a number of times the current is chopped to zero called "chop count" as every current chop dissipates a certain amount of joule energy in a semiconductor junction, wherein adding the pulse interval reduces a number of ineffective pulses which reduces the chop count as short pulses have a minimal effect for moving a magnetic armature of the branch or downstream breaker but the short pulses greatly increase the chop count.

5. The circuit breaker distribution system of claim 4, wherein the pulse interval minimizes the chop count required to de-latch the branch or downstream breaker and lengthens the selectivity delay, spreading out the chop count over a longer time to reduce a peak temperature of a semiconductor junction.

6. The circuit breaker distribution system of claim 5, wherein the solid-state circuit breaker comprising:
  a user interface in which the selectivity delay can optionally be adjustable, wherein after the selectivity delay is exceeded, the solid-state circuit breaker will shut OFF the current and open such that the repeated pulses will cease,
    wherein a length of the pulse interval is tuned to a fixed value in a firmware or the length of the pulse interval is adjusted by an algorithm in the firmware or the length of the pulse interval is tunable in the user interface, and
    wherein tuning the pulse interval means adjusting 60° and 30° phase angles to different values.

7. The circuit breaker distribution system of claim 6, wherein if the branch or downstream breaker trips during the selectivity delay, the solid-state circuit breaker is programmed to recognize that the current is no longer rising to the chop level so then ceases to chop the current,
  wherein the solid-state circuit breaker returns to a continuous ON state and allows current to flow to other branches downstream thus selectivity is achieved because only the branch or downstream breaker has tripped and cut off current to a branch circuit containing the fault.

8. The circuit breaker distribution system of claim 1, wherein each pulse of current that is let through the solid-state circuit breaker has a variable length of time because different lengths of time are required for the current to rise to the chop level such that a solid-state circuit breaker chop criterion is the chop level and not a specific length of time, wherein a solid-state circuit breaker chopping algorithm is programmed in a way to allow the current to rise to the chop level and then cut the current to zero.

9. The circuit breaker distribution system of claim 8, wherein shape of a waveform is dependent on a phase angle of a voltage waveform at a precise moment each pulse begins such that a pulse that begins at a 0° phase angle has a different rate of rise and shape than a pulse that begins at a 90° phase angle.

10. The circuit breaker distribution system of claim 9, wherein each pulse begins at a different voltage phase angle so each pulse requires a different length of time to rise to the chop level.

11. A method of providing selective coordination in a circuit breaker distribution system, the method comprising:
  providing a solid-state circuit breaker disposed as a main or upstream breaker; and
  providing a thermal/magnetic circuit breaker disposed as a branch or downstream breaker, and
  wherein the solid-state circuit breaker comprises a microcontroller including a processor and a memory,
  semiconductor junctions, and
  computer-readable logic code stored in the memory which, when executed by the processor, causes the microcontroller to:
    allow repeated pulses of current through to the branch or downstream breaker in an event of an overload or short circuit,
    choose a maximum current limit for the solid-state circuit breaker as a "chop level" such that the chop level is chosen higher than a rated current of the solid-state circuit breaker but low enough that the solid-state circuit breaker is not damaged from repeated pulses over a period of time needed to trip the branch or downstream breaker,
    add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform, wherein a width of each current pulse is not controlled, but rather the width follows naturally from the starting of the rise of current to the maximum peak current and a time required to reduce it to zero,
    use a phase angle of the system voltage waveform as a criterion for beginning and ending the pulse interval such that the pulse interval begins at 60 degrees after a zero crossing and ends at 120 degrees after a zero crossing,
    wherein the current remains at zero between 60 and 120 degrees after a zero crossing, and
    wherein a length of the pulse interval may be tuned by adjusting 60 and 120 degree phase angles to different angles.

12. The method of claim 11, wherein the solid-state circuit breaker is arranged in a hierarchical manner such that the main or upstream breaker feeds power to the branch or downstream breaker,
   wherein the branch or downstream breaker feeds power to either end loads or to further smaller branch breakers,
   wherein when a fault occurs, only a circuit breaker which is immediately upstream of the fault will trip thus limiting an interruption of power to only that part of a circuit which is experiencing a problem, for example, if a fault occurs at an end load, only the branch or downstream breaker of that circuit should trip, and not the main or upstream breaker,
   wherein in an event of an overcurrent condition which causes the solid-state circuit breaker to stop the current at the chop level, the repeated pulses of overload or short circuit current are subsequently delivered to a downstream circuit, and
   wherein the chop level is chosen high enough that a magnetic actuator in the branch or downstream breaker has sufficient force to actuate tripping in a downstream device, but low enough that repeated momentary peaks of current do not damage the semiconductor junctions of the solid-state circuit breaker.

13. The method of claim 12, wherein the solid-state circuit breaker passes chopped current when the system voltage waveform has a phase angle plus or minus 60° of system voltage zero but for rest of the system voltage waveform when the phase angle is within plus or minus 30° of peak voltage then the solid-state circuit breaker remains in an OFF state and passes no current.

14. The method of claim 13, wherein the repeated pulses are to be continued for a specified delay period being a preset length of time called a selectivity delay which gives the branch or downstream breaker time to trip, wherein the pulse interval allows the selectivity delay to be increased without increasing a number of times the current is chopped to zero called "chop count" as every current chop dissipates a certain amount of joule energy in a semiconductor junction,
   wherein adding the pulse interval reduces a number of ineffective pulses which reduces the chop count as short pulses have a minimal effect for moving a magnetic armature of the branch or downstream breaker but the short pulses greatly increase the chop count.

15. The method of claim 14, wherein the pulse interval minimizes the chop count required to de-latch the branch or downstream breaker and lengthens the selectivity delay, spreading out the chop count over a longer time to reduce a peak temperature of a semiconductor junction.

16. The method of claim 15, wherein the solid-state circuit breaker comprising:
   a user interface in which the selectivity delay can optionally be adjustable, wherein after the selectivity delay is exceeded, the solid-state circuit breaker will shut OFF the current and open such that the repeated pulses will cease,
      wherein a length of the pulse interval is tuned to a fixed value in a firmware or the length of the pulse interval is adjusted by an algorithm in the firmware or the length of the pulse interval is tunable in the user interface.

17. The method of claim 16, wherein if the branch or downstream breaker trips during the selectivity delay, the solid-state circuit breaker is programmed to recognize that the current is no longer rising to the chop level so then ceases to chop the current,
   wherein the solid-state circuit breaker returns to a continuous ON state and allows current to flow to other branches downstream thus selectivity is achieved because only the branch or downstream breaker has tripped and cut off current to a branch circuit containing the fault.

18. The method of claim 11, wherein each pulse of current that is let through the solid-state circuit breaker has a variable length of time because different lengths of time are required for the current to rise to the chop level such that a solid-state circuit breaker chop criterion is the chop level and not a specific length of time, wherein a solid-state circuit breaker chopping algorithm is programmed in a way to allow the current to rise to the chop level and then cut the current to zero.

19. The method of claim 18, wherein shape of a waveform is dependent on a phase angle of a voltage waveform at a precise moment each pulse begins such that a pulse that begins at a 0° phase angle has a different rate of rise and shape than a pulse that begins at a 90° phase angle.

20. The method of claim 19, wherein each pulse begins at a different voltage phase angle so each pulse requires a different length of time to rise to the chop level.

21. A circuit breaker distribution system configured to provide selective coordination, the system comprising:
   a solid-state switch disposed as a main or upstream breaker; and
   a switch with an over current protection disposed as a branch or downstream breaker,
   wherein the solid-state switch comprises a microcontroller including a processor and a memory, and
   computer-readable logic code stored in the memory which, when executed by the processor, causes the microcontroller to:
      allow repeated pulses of current through to the branch or downstream breaker in an event of an overload or short circuit, and
      choose a maximum current limit for the solid-state switch as a "chop level" such that the chop level is chosen higher than a rated current of the solid-state switch but low enough that the solid-state switch is not damaged from repeated pulses over a period of time needed to switch OFF the branch or downstream breaker,
      add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform, wherein a width of each current pulse is not controlled, but rather the width follows naturally from the starting of the rise of current to the maximum peak current and a time required to reduce it to zero,
      use a phase angle of the system voltage waveform as a criterion for beginning and ending the pulse interval such that the pulse interval begins at 60 degrees after a zero crossing and ends at 120 degrees after a zero crossing,
         wherein the current remains at zero between 60 and 120 degrees after a zero crossing, and
         wherein a length of the pulse interval may be tuned by adjusting 60 and 120 degree phase angles to different angles.

22. A circuit breaker distribution system configured to provide selective coordination, the system comprising:

a solid-state switch disposed as a main or upstream breaker;

a switch with an over current protection disposed as a branch or downstream breaker, wherein the solid-state switch comprises transistors that are controllable to turn ON and OFF; and a current sensing circuit or a current sensing device configured to turn OFF and ON the solid-state switch which allows repeated pulses of current through to the branch or downstream breaker in an event of an overload or short circuit, chooses a maximum current limit for the solid-state switch as a switch OFF or a "chop" level such that the "chop" level is chosen higher than a rated current of the solid-state switch but low enough that the solid-state switch is not damaged from repeated pulses over a period of time needed to switch OFF the branch or downstream breaker, and adds a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform, wherein the solid-state switch further comprises a microcontroller including a processor and a memory and computer-readable logic code stored in the memory which, when executed by the processor, causes the microcontroller to:

allow repeated pulses of current through to the branch or downstream breaker in an event of an overload or short circuit, choose a maximum current limit for the solid-state switch as a switch OFF or a "chop" level such that the "chop" level is chosen higher than a rated current of the solid-state switch but low enough that the solid-state switch is not damaged from repeated pulses over a period of time needed to switch OFF the branch or downstream breaker, add a pulse interval which is optimized to a system voltage waveform in that chopped pulses tend to be longer and more effective for de-latching the branch or downstream breaker when they occur in vicinity of a zero crossing of the system voltage waveform and chopped pulses are shorter and less effective near peaks of the system voltage waveform, wherein a width of each current pulse is not controlled, but rather the width follows naturally from the starting of the rise of current to the maximum peak current and a time required to reduce it to zero, use a phase angle of the system voltage waveform as a criterion for beginning and ending the pulse interval such that the pulse interval begins at 60 degrees after a zero crossing and ends at 120 degrees after a zero crossing, wherein the current remains at zero between 60 and 120 degrees after a zero crossing, and wherein a length of the pulse interval may be tuned by adjusting 60 and 120 degree phase angles to different angles.

\* \* \* \* \*